US005734824A

United States Patent [19]
Choi

[11] Patent Number: 5,734,824
[45] Date of Patent: Mar. 31, 1998

[54] APPARATUS AND METHOD FOR DISCOVERING A TOPOLOGY FOR LOCAL AREA NETWORKS CONNECTED VIA TRANSPARENT BRIDGES

[75] Inventor: Isaac P. Choi, San Jose, Calif.

[73] Assignee: Bay Networks, Inc., Santa Clara, Calif.

[21] Appl. No.: 758,291

[22] Filed: Dec. 3, 1996

Related U.S. Application Data

[63] Continuation of Ser. No. 16,170, Feb. 10, 1993, abandoned.

[51] Int. Cl.$^6$ .................................................. G06F 13/00
[52] U.S. Cl. ........................ 395/200.11; 395/200.02; 395/200.1; 370/254; 370/401; 370/405
[58] Field of Search ................ 395/200.11, 200.02, 395/200.1; 370/85, 943, 60, 254, 401, 405

[56] References Cited

U.S. PATENT DOCUMENTS

| | | | |
|---|---|---|---|
| 4,864,559 | 9/1989 | Perlman | 370/60 |
| 4,914,571 | 4/1990 | Baratz et al. | 395/600 |
| 5,018,133 | 5/1991 | Tsukakoshi et al. | 370/16 |
| 5,018,137 | 5/1991 | Backes et al. | 370/85.13 |
| 5,150,360 | 9/1992 | Perlman et al. | 370/94.3 |
| 5,226,120 | 7/1993 | Brown et al. | 395/200.11 |
| 5,245,609 | 9/1993 | Ofek et al. | 370/94.3 |
| 5,283,783 | 2/1994 | Nguyen et al. | 370/16.1 |
| 5,295,154 | 3/1994 | Meier et al. | 375/200 |
| 5,319,644 | 6/1994 | Liang | 370/85.5 |
| 5,345,558 | 9/1994 | Opher et al. | 395/200.15 |
| 5,355,371 | 10/1994 | Auerbach et al. | 370/60 |
| 5,361,250 | 11/1994 | Nguyen et al. | 370/16.1 |
| 5,398,242 | 3/1995 | Perlman | 370/85.13 |
| 5,428,636 | 6/1995 | Meier | 375/202 |
| 5,432,789 | 7/1995 | Armstrong et al. | 370/92 |
| 5,432,907 | 7/1995 | Picazo et al. | 395/200.02 |
| 5,483,522 | 1/1996 | Derby et al. | 370/54 |
| 5,504,746 | 4/1996 | Meier | 370/85.13 |
| 5,515,513 | 5/1996 | Metzger et al. | 395/200.15 |
| 5,517,622 | 5/1996 | Ivanoff et al. | 395/200.13 |
| 5,546,540 | 8/1996 | White | 395/200.1 |
| 5,586,267 | 12/1996 | Chatwani et al. | 395/200.11 |
| 5,606,664 | 2/1997 | Brown et al. | 395/200.1 |

OTHER PUBLICATIONS

IEEE Std 802.1D–1990, Standards for Local and Metropolitan Area Networks; Media Acess Control (MAC) Bridges, Mar. 8, 1991, pp. 1–176, 260–261, 1–29.

*Primary Examiner*—Christopher B. Shin
*Attorney, Agent, or Firm*—Blakely, Sokoloff, Taylor & Zafman

[57] ABSTRACT

A system of discovering the active topology of the LANs (local area networks) connected via any apparent bridges that conform to the IEEE 802.1D standard. A discovered active topology of the present invention consists of the active bridges, the LANs and the NMMs (network management modules) that constitute the bridged LAN. The system of the present invention advantageously utilizes the standard (IEEE 802.1D) defined behaviors of transparent bridges to discover the active topology. In so doing, the present invention does not require the bridges to issue any special proprietary frames for development of the active topology. The IEEE 802.1D conforming bridges have the property of forming a path between two conversing end stations. If the two end stations reside in adjacent LANs, the path between these two LANs only has the connecting bridge and no other LAN in between. The present invention utilizes this property in discovering the complete active topology of a bridged LAN via special communications between NMMs located on the LANs. Via cyclic processing and age out functions, the present invention is able to alter the active topology in response to changes within the bridged LAN.

21 Claims, 9 Drawing Sheets

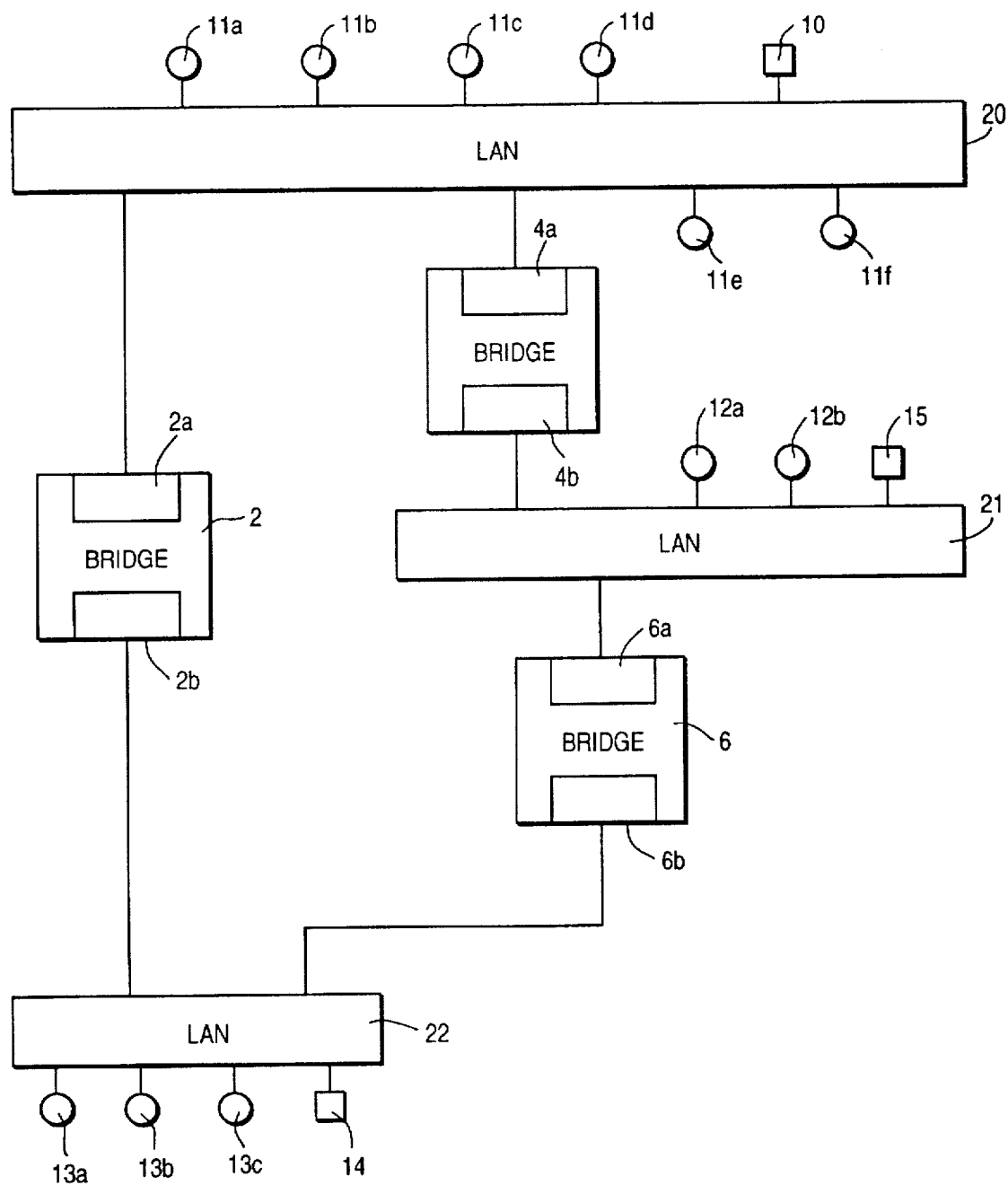
FIG_1 (PRIOR ART)

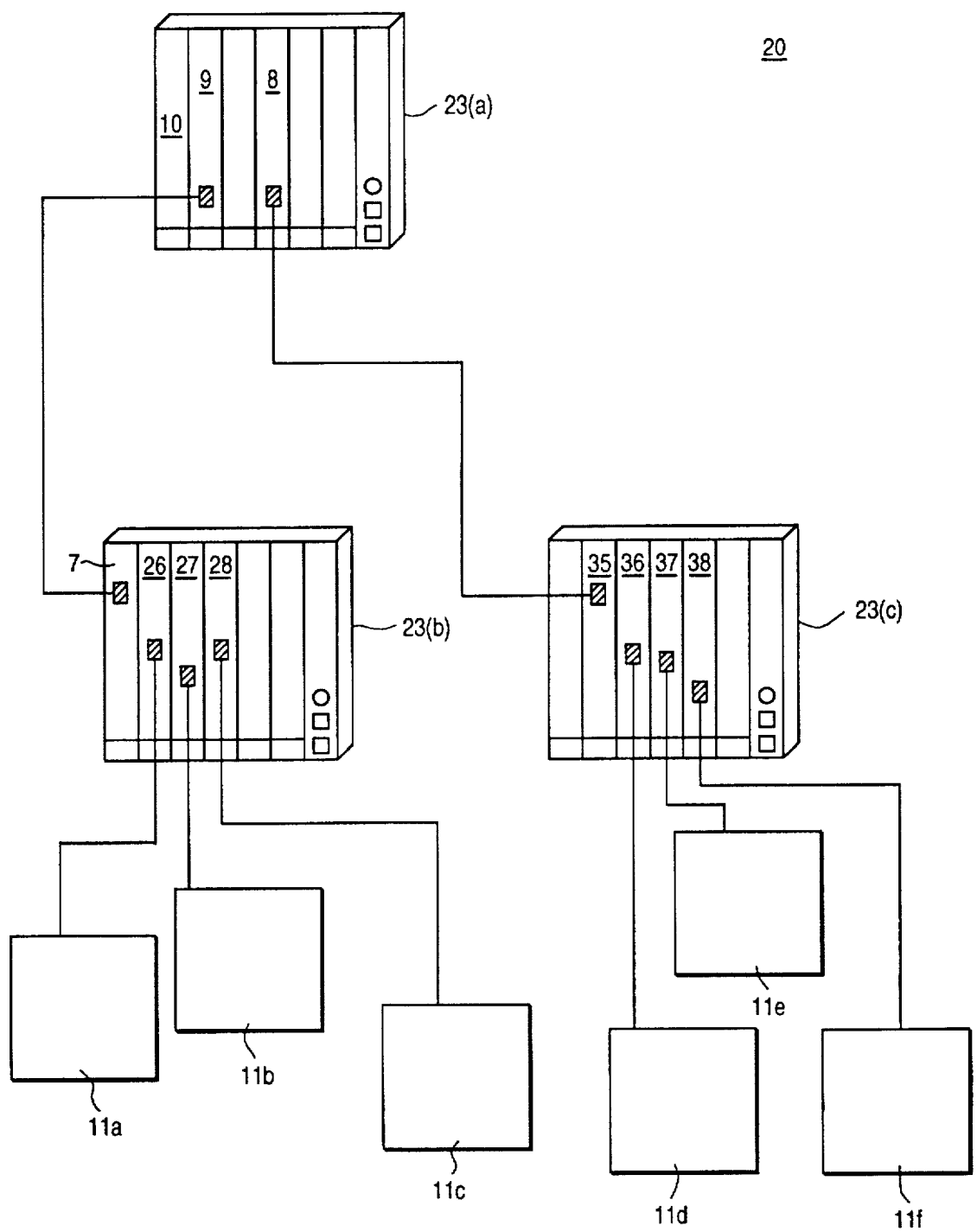
FIG_2 (PRIOR ART)

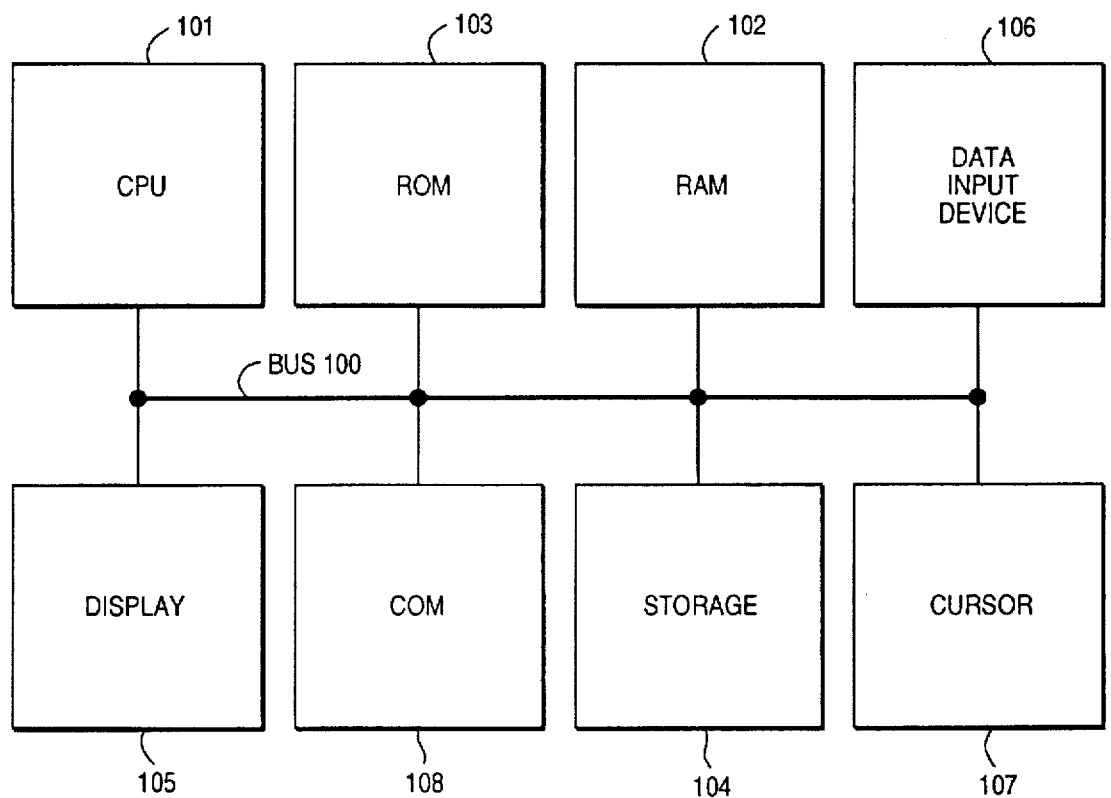
FIG_3

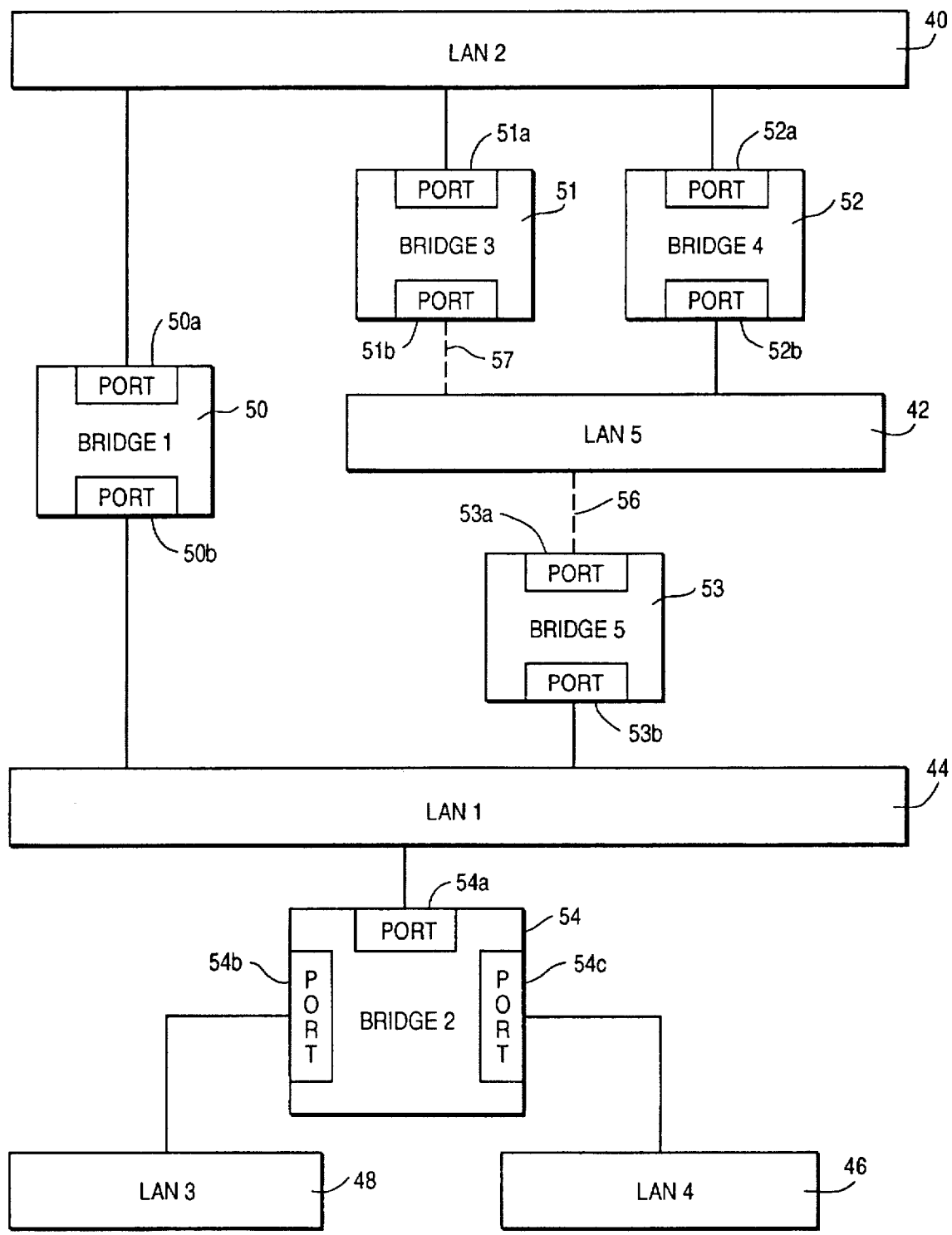
FIG_4

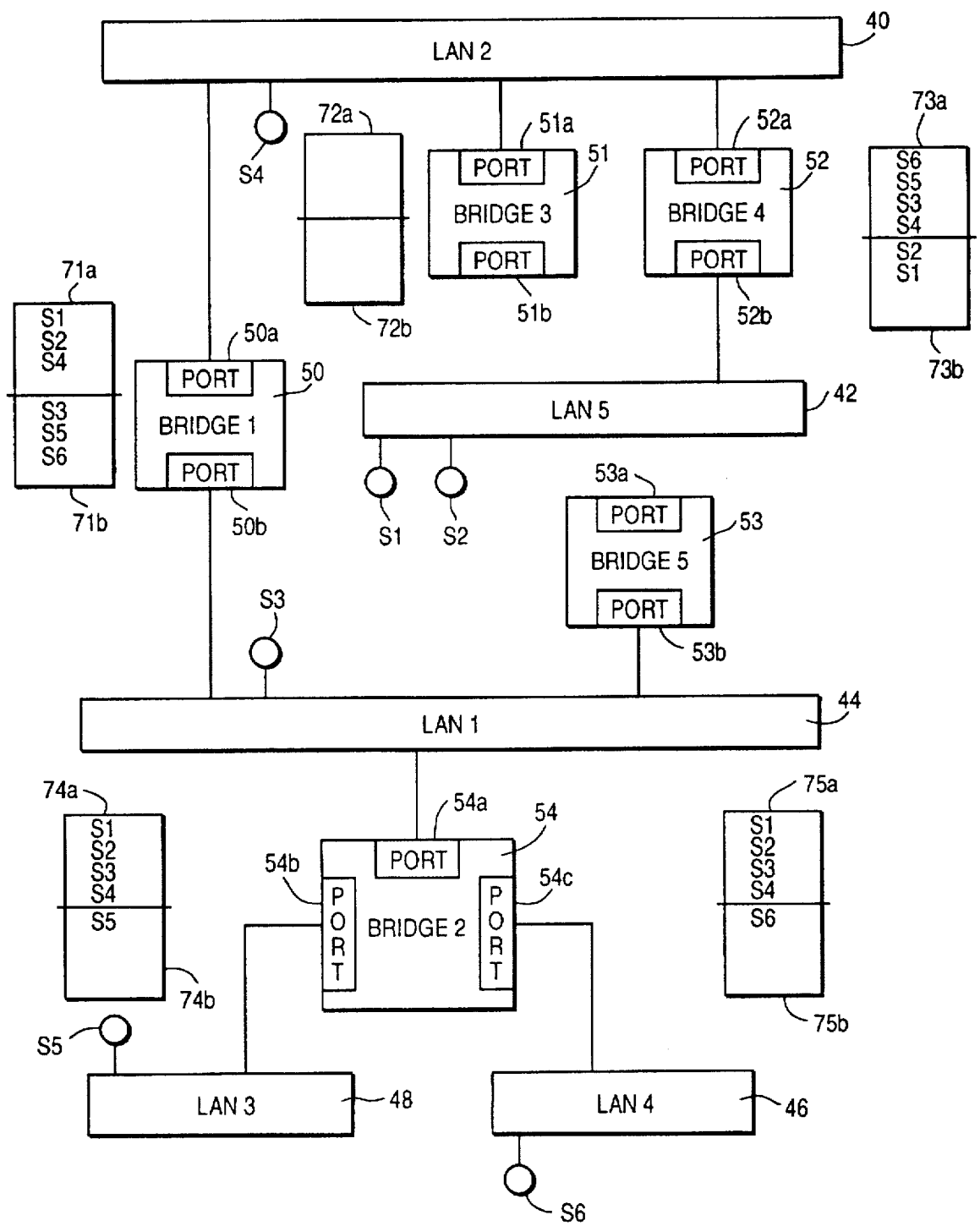
FIG_5

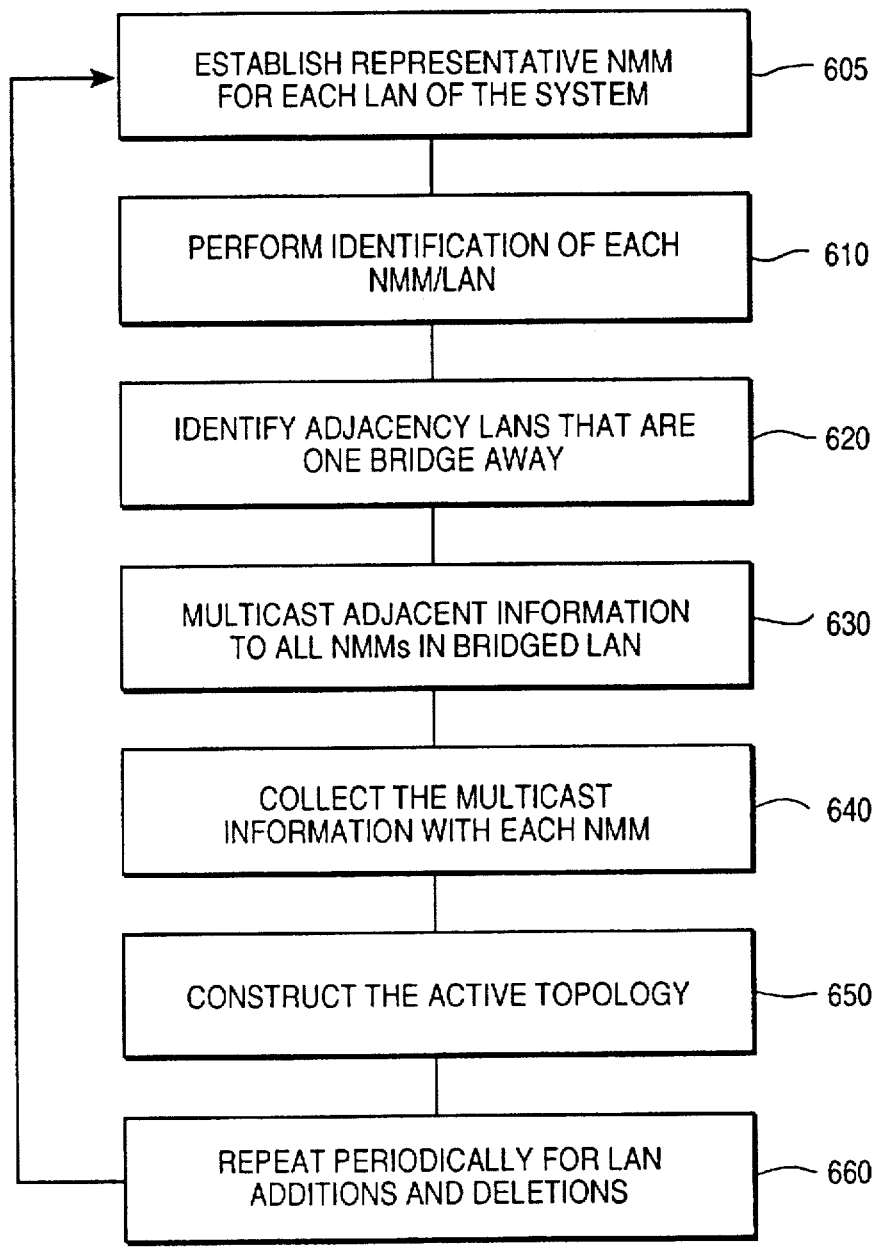
FIG_6

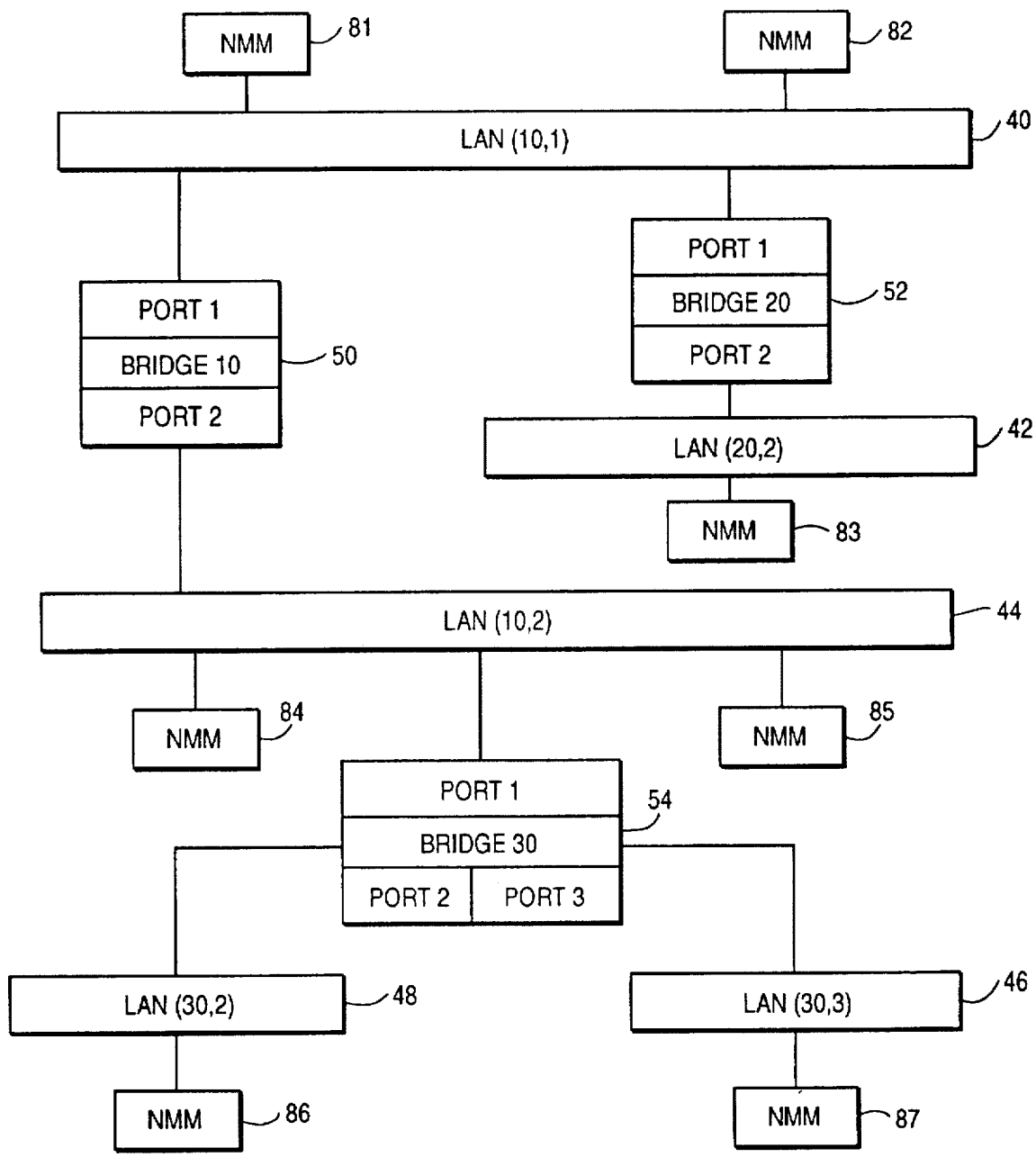
FIG_7

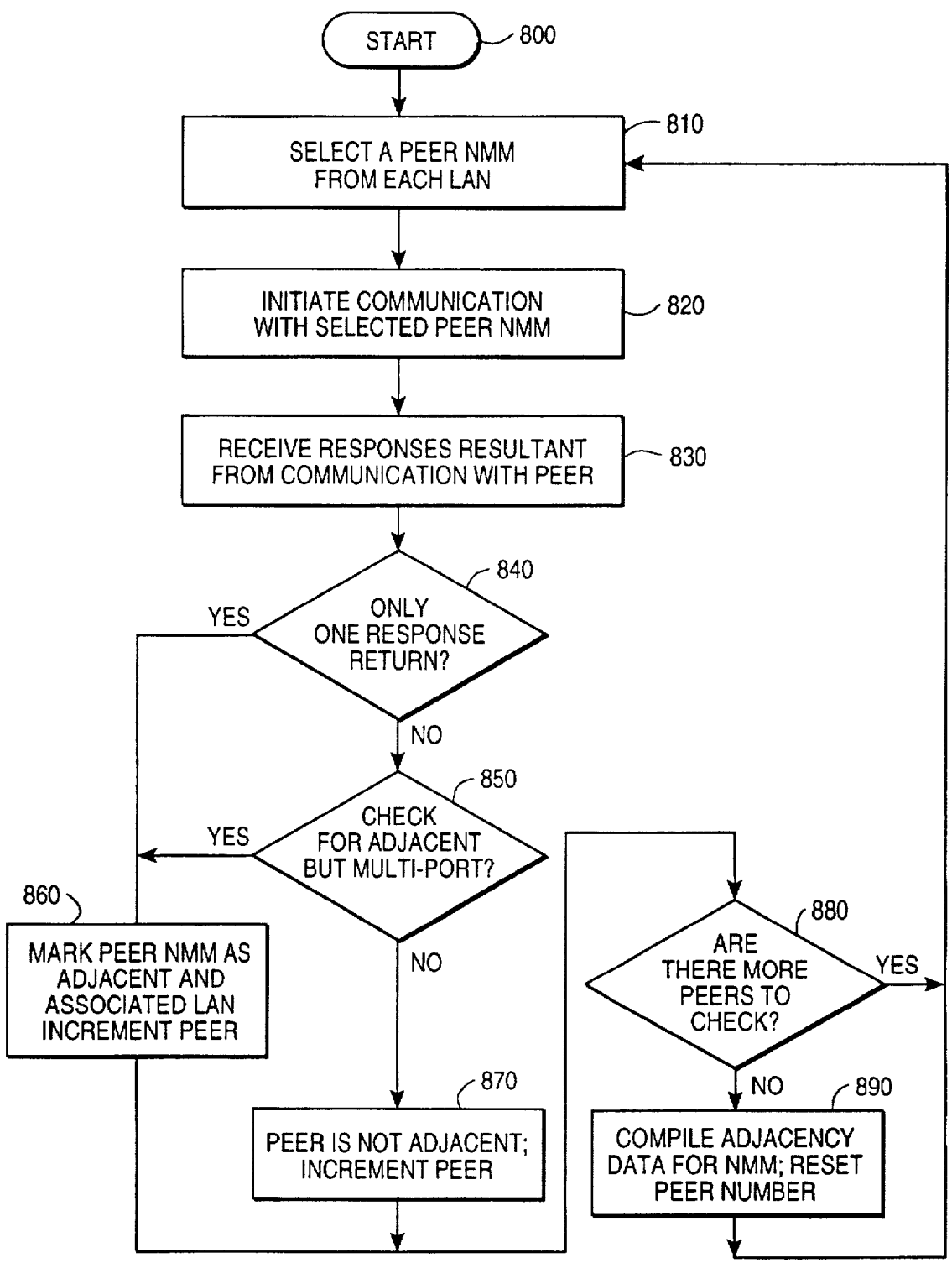
FIG_8

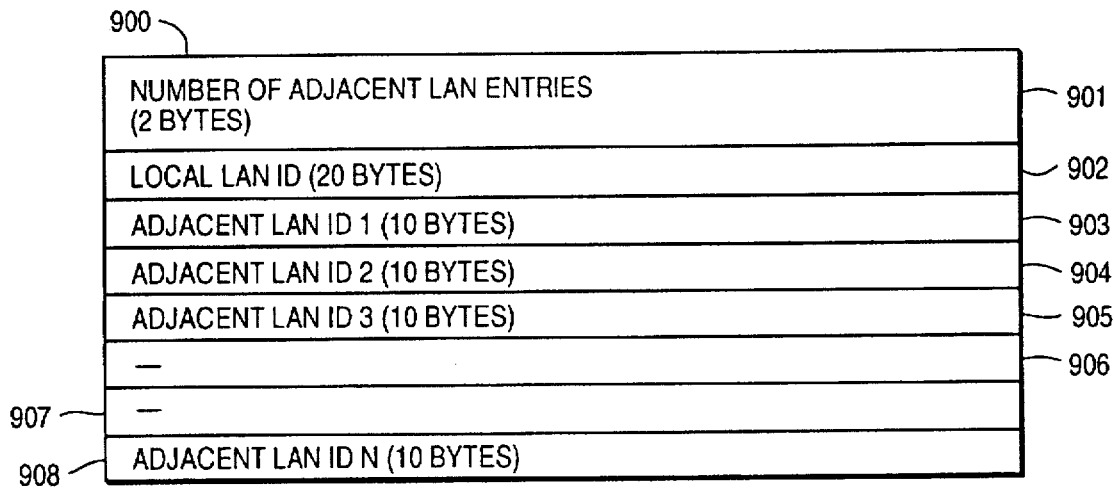
FIG_9A
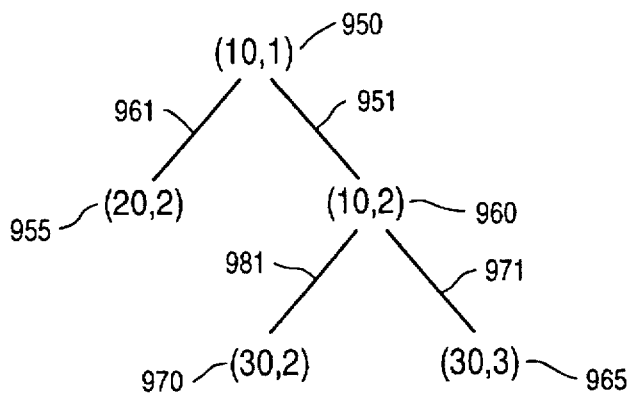
FIG_9B
FIG_9C

APPARATUS AND METHOD FOR DISCOVERING A TOPOLOGY FOR LOCAL AREA NETWORKS CONNECTED VIA TRANSPARENT BRIDGES

This application is a continuation of application Ser. No. 08/016,170 filed Feb. 10, 1993, now abandoned.

BACKGROUND OF THE INVENTION

1) Field of the INvention

The present invention relates to the field of information communication within a communication system or network. More specifically, the present invention relates to the field of topology generation for a system utilizing local area networks connected together via transparent bridges.

(2) Prior Art

Local area networks, also called "LANs," are largely used as a means to provide a communication system between various workstations, peripherals and elements of a computer system. Using local area networks, several otherwise independent computer systems may be communicatively coupled together so that each may share information with the others or one may control the other. Also, other computer system components or peripherals, such as disk drives, printers, modems, display devices, etc. may be coupled to the local area network for communication and control between the workstations. Therefore, with a local area network several workstations may share information between other workstations and/or control other computer system components or peripherals. Local area networks have proven to be a very efficient and advantageous way to interconnect office computers and peripherals into centralized computer systems for information exchange and time-sharing of computer peripherals.

A local area network may individually contain up to 1024 stations per LAN, each station may be a computer system (workstation) or may be a peripheral or other computer elements. An entire bridged LAN may contain any number of LANs coupled by bridges. Typical LANs contain up to 10 to 20 workstations and/or peripherals and a bridged LAN may contain any number of LANs thereby allowing a flexible amount of stations to become interconnected via the bridged LAN. Information may be exchanged between all stations coupled to the bridged LAN using a token ring communication scheme or an Ethernet communication scheme. Individual local area networks may be connected together so that each station of one LAN may communication to other stations on the other LAN. LANs are connected via specialized bridges; each bridge contains at least two ports. Bridges having two ports are called dual ported bridges and multiported bridges have at least three or more ports.

A Bridged LAN Topology

FIG. 1 illustrates a bridged LAN topology of a communication system employing LANs and bridges. Bridges provide communication pathways between adjacent LANs. The topology of FIG. 1 shows a typical prior art coupling of three LANs and three bridges. LAN 20 is illustrated with six stations 11a–11f coupled to the LAN as well as a network management module 10. Each of these stations may be a workstation (i.e., an independent computer system) or a peripheral or other computer element. Station 10 is the designated network management module ("NMM") of the LAN 20. Each LAN has a designated network management module that controls and monitors communication between the stations of the LAN and communications in and out of the LAN. LAN 20 is coupled to port 4a of bridge 4. The other port, port 4b of bridge 4, is coupled to a second LAN 21. LAN 21 has two stations 12a and 12b and a designated network management module 15. As shown, LAN 21 is coupled to port 6a of bridge 6. Bridge 6 is coupled via port 6b to a third LAN 22 which has three stations 13a, 13b and 13c as well as a designated network management module 14. Network management module 14 controls and monitors communication between the stations of LAN 22 and network management module 15 controls and monitors communication between the stations of LAN 21. It is noted that LAN 20 is also coupled to bridge 2 via port 2a and LAN 22 is coupled to bridge 2 via port 2b. Each station and NMM located on a LAN has an associated unique address called a MAC address.

Components of a LAN

It is helpful to understand how an individual LAN is physically composed and how it provides connections to stations. Individual LANs may be constructed using concentrators. FIG. 2 illustrates one implementation of LAN 20 of FIG. 1. Generally, FIG. 2 shows that LAN 20 is composed of three concentrators. Concentrator 23b provides a communication hub for stations 11a, 11b and 11c while concentrator 23c provides a communication hub for stations 11d, 11e, and 11f. Each station is coupled to a connectivity module of the associated concentrator. Concentrator 23a provides a communication pathway and communication control between concentrators 23b and 23c. In this fashion, all of the stations 11a through 11f are communicatively connected together. Since each concentrator has an NMM, there are three NMMs for this LAN 20 and they are 10, 7 and 35. The NMMs are located as modules within slots of the concentrators. Although there are three NMMs within LAN 20, LAN 20 will select only one designated or representative NMM of these NMMs. FIG. 2 illustrates that NMM 10 is the designated NMM for the LAN 20 for reasons which will be explained elsewhere.

The three concentrator units 23a, 23b, and 23c are shown coupled together by conventional communication cable. The concentrators shown are intelligent concentrators in that they provide much more than a mere coupling location but also provide communication control and error handling within the communication system. Each concentrator has several modules which are shown as vertical blocks within each concentrator. Modules are coupled together within slots of a concentrator which are all coupled together via a backplane bus (not shown) which is common to all modules. Each module bears several ports, each port may couple to a different station. The NMM is responsible for network communication control within each concentrator and also for controlling and providing communication capability between individual concentrators. Concentrator 23b is coupled via NMM 7 to module 9 of concentrator 23a; module 9 is an interconnection module. Further, concentrator 23c is coupled via NMM 35 with module 8 of concentrator 10; module 8 is an interconnection module. In this way, all three concentrators are communicatively connected together and allow their associated stations to form a single communication topology which may be a token ring or ethernet type. Therefore, it can be appreciated that a LAN is not necessarily composed of a single concentrator but several concentrators may to coupled together to form a single LAN.

Need for Overall Topology of LANs and Bridges

As shown in FIG. 1, the interconnections between LANs and bridges may become very complex and the topologies allowed are virtually infinite in a bridged LAN. In order for communications between LANs to be efficient, it would be helpful for each LAN to be aware of the overall topology of the communication system. When the overall topology of the communication system is known the administration and management of the LANs can be done more effectively and efficiently. Furthermore, communication efficiency is increased and communication errors can be reduced. With an overall topology component additions and component failures can be more readily detected or isolated, as the case may be. It should be appreciated that communication systems can be constructed by merely physically coupling LANs and bridges together via communication links without informing the communication system ahead of time of the location or strategy of the interconnections or the substance of the interconnections. That is, a configured communication system must figure out for itself the communication topology of the system because this information is not automatically supplied by the components in the bridged LAN.

Prior art methods of topology generation for LANs and bridges exist, but these prior art methods are not fully advantageous for a number of reasons. For instance, one such prior art system generates a topology of the LANs and bridges by employing specialized and proprietary "hello" messages that are generated and transmitted by each bridge of the system to allow the NMMs of the LANs to discover their local bridges and generate a topology therefrom. That is, each bridge of the system periodically communicates a special and proprietary message at specific intervals to indicate that the bridge is within the system and information regarding its location relative to the other bridges and LANs of the bridged LAN. The NMMs of the LANs of this prior art system then listen for these specialized messages and are responsible for generating and maintaining the topology information. This method is helpful in that it discovers bridges by listening for the specialized and proprietary "hello" messages generated by the bridges. However, this method of topology generation is limited in that transparent bridges that are third party bridges (i.e., not allowed to use the proprietary "hello" messages) do not generate the specialized "hello" messages and will therefore not be included within the topology that is generated since these bridges will not be heard by the NMMs. This is disadvantageous because it is desirable to include all bridges within the discovered topology, not just certain bridges. What is needed is a system for discovering the active topology of the LANs connected via any transparent bridges whether or not the bridges generate the specialized and proprietary "hello" messages. The present invention allows such capability.

Another prior art system is called a spanning tree algorithm which is specified within the IEEE 802.1D specification. Its purpose is to locate and remove redundant communication pathways and communication loops from within a bridged LAN. To this extent, each bridge realizes some information about its adjacent neighbors. However, the overall active topology of the communication system is not known by any one bridge or NMM of the bridged LAN. Each particular bridge contains various information concerning the location of particular LANs and the identification of the stations in the LANs with reference to the ports of that particular bridge. Thus, each bridge may know some information regarding its adjacent interconnections but no bridge knows the overall topology. Further, merely listening to the communication packets of the spanning tree procedure is not sufficient for any one NMM to generate the overall active topology of the bridged LAN. This prior art procedure alone cannot be used to reconstruct the entire active topology for all LANs and bridges. What is needed is a procedure that automatically generates the overall topology for all LANs and those transparent bridges that conform to the IEEE 802.1D specification. The present invention provides such capacity and function.

Another prior art system is the Open Shortest Path First (OSPF) procedure. This is a standard routing protocol for information processing, however, this method is responsible for building the topology of an internet, i.e., a topology of networks connected with routers. This prior art method cannot be used, as is, for building or maintaining the active topology of a bridged LAN including LANs, NMMs and bridges. What is needed is a system capable of constructing the active topology of a bridged LAN, i.e., the communicative interfaces between LANs, NMMs and associated bridges that constitute the entire communication system. The present invention offers such ability and advantageous function.

Accordingly, it is an object of the present invention to construct an active topology of a communication system having LANs that are interconnected with transparent bridges. It is another object of the present invention to construct such an active topology including transparent bridges that do not generate specialized "hello" messages. It is further an object of the present invention to generate an active topology for transparent bridges that conform to the IEEE 802.1D specification standard but do not generate any specialize proprietary messages. It is further an object of the present invention to advantageously utilize the results of the spanning tree procedure and the frame filtering behavior of the transparent bridges in order to construct an active topology of the LANs and transparent bridges within a bridged LAN communication system. These and other objects of the present invention not specifically mentioned herein will become evident in light of the discussions below.

SUMMARY OF THE INVENTION

A system of discovering the active topology of the LANs (local area networks) connected via any transparent bridges that are conformant to the IEEE 802.1D standard. A discovered active topology of the present invention consists of the active bridges, the LANs and the NMMs (network management modules) that constitute the bridged LAN. The system of the present invention advantageously utilizes the standard (IEEE 802.1D) defined behaviors of transparent bridges to discover the active topology. In so doing, the present invention does not require the bridges to issue any special proprietary frames for development of the active topology. The IEEE 802.1D conformant bridges have the property of forming a path between two conversing end stations. If the two end stations reside in adjacent LANs, the path between these two end stations only has the connecting bridge and no other LAN in between. The present invention utilizes this property in discovering the complete active topology of a bridged LAN via special communications between NMMs located on the LANs. Via cyclic processing and age out functions, the present invention is able to alter the active topology in response to changes within the bridged LAN.

The present invention includes a computer implemented apparatus for constructing an active topology of a bridged local area network ("LAN"), the bridged LAN containing a plurality of LANs communicatively coupled via a plurality of transparent bridges, wherein each LAN is coupled to at least one transparent bridge and includes a network management module ("NMM"), and wherein a plurality of communicating stations are coupled to each LAN and the NMM of each LAN is a communicating station, the apparatus including: constructing means operable within each transparent bridge for constructing communication pathways between NMMs of the plurality of LANs, the communication pathways stored in filtering databases associated with communication ports of the transparent bridges; and generating means operable within each NMM for generating an active topology of the bridged LAN, the generating means further including: first communication means for communicating an adjacency request message from a sender NMM to a receiver NMM over the communication pathways; second communication means for receiving adjacency response messages communicated by the NMMs of the bridged LAN to the sender NMM as a result of the adjacency request message, the adjacency response messages communicated over the communication pathways; and first adjacency determination means for determining if the receiver NMM is adjacent to the sender NMM if only one adjacency response message is received by the second communication means.

Embodiments of the present invention include a computer implemented apparatus for constructing an active topology of a bridged LAN as described above wherein the bridged LAN contains one or more multiported bridges and further including second adjacency determination means for determining that two different receiver NMMs are adjacent to the sender NMM if two sets of response messages received from the second communication means are constant and are resultant from adjacency request messages sent by the sender NMM to the two different receiver NMMs associated with a multiported bridge; means for compiling an adjacency database for each sender NMM, the adjacency database for recording each adjacent receiver NMM to the sender NMM; and means for multicasting the adjacency database over the bridged LAN to all other NMMs of the bridged LAN.

Embodiments of the present invention include a computer implemented apparatus for constructing an active topology of a bridged LAN as described above and wherein the generation means further comprises: means for compiling an active topology database by collecting and compiling each adjacency database multicasted onto the bridged LAN by each sender NMM; and means for displaying a diagram representation of the active topology of the bridged LAN by reading the active topology database and coupling NMMs marked as adjacent by the active topology database.

BRIEF DESCRIPTION OF THE DRAWINGS

FIG. 1 is a prior art communication system having local area networks (LANs) coupled together using bridges.

FIG. 2 is a prior an implementation of one of the local area networks illustrated in FIG. 1; the implementation includes several concentrators and workstations.

FIG. 3 is a general computer system implementation of each network management module and network management station of the present invention.

FIG. 4 is an illustration of a typical communication topology of a bridged LAN of the present invention.

FIG. 5 is an illustration of a typical communication topology of a bridged LAN of the present invention specifically illustrating the filtering databases, FIG. 6 illustrates the major processing tasks executed in cyclic fashion by the microprocessor of each representative NMM of the present invention.

FIG. 7 is an illustration of a typical bridged LAN of the present invention specifically illustrating LAN IDs and the placement of NMMs and representative NMMs, FIG. 8 is a more detailed flow chart of the major processing block of the present invention that performs the adjacency determination procedures performed by each representative NMM of a bridged LAN.

FIG. 9(A) is an illustration of an adjacency database that is created and multicast by each representative NMM of the present invention in a bridged LAN.

FIG. 9(B) is an illustration of an active topology database that is created by each representative NMM upon receipt of the multicasted adjacency databases from each other NMM of the present invention.

FIG. 9(C) illustrates a displayable active topology or spanning tree topology generated by the present invention which represents a bridged LAN.

DETAILED DESCRIPTION OF THE INVENTION

The present invention includes an apparatus and method for discovering the active topology of a bridged LANs containing transparent LANs that do not generate specialized "hello" messages over the system. The preferred embodiment of the present invention advantageously utilizes the results of the spanning tree and frame filtering procedures of IEEE 802.1D-1990 in order to perform the processing tasks required for generating the above active topology. The processing required of the present invention takes place within each designated Network Management Module of the LANs of the overall communication system and may partly take place within a Network Management Station: (NMS)

In the following detailed description of the present invention numerous specific details are set forth in order to provide a thorough understanding of the present invention. However, it will be obvious to one skilled in the art that the present invention may be practiced without these specific details. In other instances well known methods and components have not been described in detail as not to unnecessarily obscure the present invention. It is appreciated that all references to bridges within this detailed description of the present invention (unless specifically identified or stated as otherwise) refer to LAN transparent bridges that conform to the IEEE 802.1D specification.

In general, a network management module or station employed by the present invention may be considered a separate computer system having data and command processing capabilities in order to execute software commands. To the extent that the NMM or NMS is discussed within this specification as performing commands and processing data, it is understood that such functions may be implemented in hardware or software within such units. The instructions required for these software implemented functions of the present invention will operate within the NMMs. In order to provide a detailed description of the present invention, the components of each NMM that may be used for software execution are disclosed in FIG. 3.

As discussed, processing performed within the preferred embodiment of the present invention may be accomplished with a network management module. It is appreciated that many such devices exist within the art and any of these commercially available NMMs may be employed to advantageously perform the tasks of the present invention as described herein.

Network management modules and network management stations used by the preferred embodiment of the present invention, as illustrated in block diagram format in FIG. 3, comprise a bus 100 for communicating information, a central processor, 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user (as in a network management station, NMS, for displaying the overall active topology in diagram or graphic form), an alphanumeric input device 106 including alphanumeric and function keys coupled to the bus 100 for communicating information and command selections to the central processor 101 from the user, a cursor control device 107 coupled to the bus for communicating user input information and command selections to the central processor 101, and a signal generating device 108 coupled to the bus 100 for communicating command selections to the processor 101.

In the present invention, the signal generation device 108 of FIG. 3 includes various input and output communication ports for receiving and transmitting communication data and instructions with the communication system. The display device 105 utilized with the network management modules and the communication system of the present invention may be a liquid crystal device, cathode ray tube, or other display device suitable for creating graphic images, alphanumeric characters recognizable to the user, or graphic images or diagrams of an active topology of the bridged LAN 61. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices, including those uniquely developed for the disabled. The cursor device may be used by the present invention in order to allow a user to interface with a network management system to scan different portions of an active topology displayed on display device 105.

Source Bridge and Transparent Bridge

Source bridges are those that require each individual end station to determine and record communication routes between communicating stations. Transparent bridges, on the other hand, determine the communication pathways in between communication stations and the stations are not required to determine or maintain this information. The present invention operates with transparent bridges. To this extent, transparent bridges of the present invention are responsible for determining a unique communication pathway between two communicating stations of the communication system (called end stations). In so doing, the communicating stations of the system themselves do not have to maintain this information and may rely on the bridges to determine the communication pathway and carry messages between LANs. The present invention utilizes the pathways generated via the spanning tree procedure as one input in order to construct the active topology of the transparent bridges and associated LANs.

The Spanning Tree Procedure

The pertinent aspects of the spanning tree procedure of the IEEE 802.1D-1990 standard utilized within the present invention are now explained. The present invention utilizes a spanning tree procedure as described in the well known IEEE 802.1D-1990 specification. It is appreciated that the IEEE 802.1D standard is but one procedure that may be utilized by the present invention to create communication pathways between end stations. The present invention is, therefore, not limited to merely this one standard but applies to any procedure that creates communication pathways stored within transparent bridges that connect end stations. This spanning tree procedure is utilized in order to eliminate communication loops in a communication system and, in conjunction with frame filtering, to construct communication pathways between communicating end stations of the network 61. The communication pathways are formed using information contained by the bridges of the system.

Refer to FIG. 4 where an illustrative communication system 61 is shown. FIG. 4 illustrates the total topology including all connections between bridges and LANs of network 61. It is noted that the spanning tree procedure will not determine the overall active topology but will perform processing to eliminate redundant communication paths and will eliminate communication loops within the system 61. The active topology is that topology that eliminates communication loops redundant communication paths within the system. Although the spanning tree procedure acts to perform the above functions, it operates on a bridge by bridge (or node by node) basis without regard for the overall or total picture (topology). That is, no particular node or bridge within the system 61 will realize the total active topology of the system 61 after the spanning tree procedure stabilizes. Although specialized filtering databases within each bridge will specify a communication pathway between end stations, without the present invention no one particular bridge, station, NMM or LAN will realize the total active topology and such cannot be obtained by merely listening to the spanning tree packets. As will be discussed, the present invention will utilize the result of the spanning tree procedure in order to advantageously generate a total active topology of system 61 that will reside in every representative NMM.

The system of FIG. 4 contains five LANs and five bridges. Each LAN has a designated NMM (not shown herein) which is determined as that NMM with the lowest MAC address of the NMMs of the LAN. LAN 40 is shown coupled to port 51a of Bridge 51 as well as to port 52a of bridge 52. LAN 40 is also coupled to port 50a of bridge 50. Port 51b of bridge 51 is coupled to LAN 42 via connection 57 (dash line) and port 52b of bridge 52 is also coupled to LAN 42 via a different interconnection line. Port 53a of bridge 53 is coupled via line 56 (dashed) to LAN 42. Bridge 53 is also coupled to LAN 44 via port 53b. Port 50b of bridge 50 is coupled to LAN 44. LAN 44 is coupled to port 54a of bridge 54 and port 54b is coupled to LAN 48 and port 54c is coupled to LAN 46. As shown all of the transparent bridges are dual ported except for bridge 54 which is multiported.

The spanning tree procedure of the present invention is performed by each of the bridges in order to first eliminate any redundant communication ports and paths. Each bridge of the system periodically generates spanning tree packets over the system 61 indicating its presence within the system. These packets contain bridge and port identifications. Each bridge essentially indicates that it is coupled to the system. These spanning tree packets are not the proprietary "hello" messages as discussed above with reference to the prior art systems. Rather, these spanning tree packets are generated by all bridges that conform to the IEEE 802.1D specification. Within these packets, each bridge indicates a unique bridge identification number to specify that a particular spanning tree message originated from a particular bridge in the network. Using the spanning tree packets, a "root" bridge is determined based on the bridge with the lowest identification address value. It is appreciated that the bridge with the largest address could also be selected as the root; the selection is essentially arbitrary to the spanning tree procedure. The NMMs of each LAN also listen to these spanning tree packets in order to assign a particular and unique identification code to each LAN. The LAN ID, as it is called, is composed of the identification of the designated bridge for that LAN as well as the port identification for that port connecting the LAN to the designated bridge. Designated bridges will be further explained to follow.

In the example of FIG. 4, the address value for bridge 50 has the highest priority. Therefore, bridge 50 is selected by the spanning tree procedure of the present invention to be the root bridge for network 61. A root bridge will be the designated bridge for all LANs that coupled with it. Next, each of the LANs must select a designated bridge. A designated bridge is that bridge that will perform the spanning tree procedure for the associated LAN from the network 61. Each LAN coupled to the root bridge will take the root bridge as its designated bridge from which to receive information. Therefore, bridge 50 will be the designated bridge for LAN 40 and also for LAN 44 since these LANs are coupled to bridge 50. These two LANs will have no other designated bridge. LAN 40 and LAN 44 will accept spanning tree packets only from bridge 50. LAN 40 also has bridge 51 and bridge 52 coupled to it, but since bridge 50 is its designated bridge, LAN 40 will not adopt either bridge 51 or bridge 52 as its designated bridge and will accept no spanning tree packets from these other bridges. It is appreciated that establishing designated bridges through the use of the spanning tree algorithm eliminates loops and redundancy in the active topology, however, a LAN can and may receive data frames (other than spanning tree packets) from non-designated bridges.

LAN 42 has three bridges 51, 52, and 53 coupled to it. Since the root bridge 50 is not coupled to LAN 42 these three bridges must compete to become the designated bridge. The bridge with the highest priority of these three is bridge 52 and it will become the designated bridge for LAN 42 and will feed spanning tree packets to LAN 42. Because the other bridges 51 and 53 were not selected to become designated bridges, their communication ports 51b and 53a to LAN 42 will be silent with respect to the spanning tree packets. In effect, one can view the connections 57 and 56 as temporarily removed from the bridged LAN 61. LAN 44 already has a designated bridge 50, but bridge 53 was not selected as a designated bridge, therefore, its connection remains via port 53b but this bridge 53 will not be carrying any messages throughout the network 61. The same is true for bridge 51. Both of these bridges have been determined by the spanning tree procedure to be redundant bridges. LANs 48 and 46 only have bridge 54 coupling them, therefore, bridge 54 becomes the designated bridge for both of these LANs and will act to feed spanning tree packets to them. Port 54a remains active coupling bridge 54 to LAN 44 because there is no other connection to LANs 48 and 46.

As illustrated by FIG. 4, the spanning tree procedure shuts down port 51b and port 53a, with respect to the periodic spanning tree packets, in order to remove the communication loop and redundant communication path that exist when these ports are active. When these ports are removed, the active topology is illustrated. The active topology of the network 61 takes on a tree structure. One communication path exists that starts at bridge 50 feeds into LAN 40 and then feeds into LAN 42. A second path exists that starts at bridge 50 again (the root bridge) and feeds into LAN 44 then to LANs 48 and 465. Of course one could also view the active topology has having only one communication pathway that starts with LAN 42, traverses LAN 40, then LAN 44 and then finally LAN 48 and LAN 46, the redundant path (57) and communication loop (56) have been severed. The active topology then is merely the network topology of FIG. 4 without connections 57 and 56 illustrated in dashed lines. It should be noted that each bridge and LAN is merely aware of its adjacent designated components. No particular bridge or LAN knows the total active topology of the network configuration. For example, bridge 52 realizes it couples LAN 40 with LAN 42 but does not know any other system information regarding the active topology of network 61.. Other processes of the present invention will determine this information.

Communication Pathways of Spanning Tree Packets

Refer to FIG. 5. After the spanning tree procedure eliminates the redundant pathways and communication loops, there will be one and only one communication pathway that will connect two communicating end stations or communicating NMMs for carrying spanning tree packets. These communication pathways of the present invention are stored within the transparent bridges and are created when stations within network 61 initially communicate with one another. That is, as two stations within the spanning tree network communicate together they form a path that is stored within the bridges. Each bridge within network 61 contains a separate filtering database associated with each port. Only the active bridges, i.e., those passing data packets are discussed in detail herein as the other are relatively quiet and do not pass messages in the bridged LAN. As shown, filtering database 72a is associated with port 51a and database 72b is associated with port 51b. Filtering database 73a is associated with port 52a and database 73b is associated with port 52b. Databases 74a and 75a are the same and represent port 54a. Database 75b is associated with port 54c while database 74b is associated with port 54b. Each filtering database is utilized by each bridge in order direct or restrict messages through specific ports to specific receiver stations which are identified within the messages.

When stations or NMMs communicate to another station or NMM, they generate and send a message packet over the bridged LAN. The sender generates the message and marks the massage as originating from the sender and then the LAN of the sender places the message onto an adjacent bridge which will carry the message to other LANs, if required. Each message that traverses a port within a bridge contains a source or sender address, SA of the sender NMM or station, and a destination or receiving address, DA of the receiving NMM or station of this message. Each filtering database records from which port a message enters the bridge as well as which station or NMM was the sender for that message. When a message enters a bridge through a port, the bridge examines the sender station address, SA, to determine that the sender station is associated with the port through which the message was received and updates a database associated with that port with the SA value. Therefore, each time a message is received into a bridge through a port, the database associated with that port is updated. Eventually, as stations communicate with each other, the filtering databases 71–75 will indicate which ports on a particular bridge are associated with which stations. This is true because all of the redundancies in the pathways and communication loops were eliminated by the spanning tree procedure.

A bridge utilizes a filtering database as following. When a message enters a first port of the bridge having a particular SA, that SA is entered into the filtering database for that first port if not previously entered. If a subsequent packet enters the first port of this bridge and has a DA (destination address) that is found within the database for the first port then that packet is not allowed to traverse the bridge. This is the case because the DA is on the other side of the bridge and the bridge does not need to recast the message. If the DA is not within the database of the entering port then the bridge will recast the message at least over the other bridge port. If no database contains the DA, then the bridge allows the message to exit all ports since the spanning tree procedure has not yet stabilized. In the above way, frame filtering is accomplished.

For example, assuming the spanning tree procedure has just started and the filtering databases are not yet constructed and no communication between stations has commenced. FIG. 5 shows that station 1 (s1) and station 2 (s2) are coupled to LAN 42. Station 4 (s4) is coupled to LAN 40 and station 3 (s3) is coupled to LAN 44. Also station 5 (s5) is coupled to LAN 48 while station 6 (s6) is coupled to LAN 46. Before any station communications, the filtering databases 71–75 are completely blank and no filtering data exists. When station s1 communicates to station s2, since no data is within any of the filtering bridges, all of the active bridges 52, 50, and 54 carry and forward this message through all ports even though s1 and s2 are on the same LAN 42. It is appreciated that unless indicated differently by the filtering databases, each bridge of the system 61 will forward every received message to the other bridges according to the spanning tree topology no matter where the destination is located. Regarding the message from station s1 to s2, each bridge in the network 61 will receive and repeat this package until the packet has traversed each bridge in the system 61 because none of the bridges yet know where station s2 is located.

As a result of passing this message through all of the bridges, filtering database 73b gets updated because the sender station s1 message packet was received by port 52b and, therefore, the identification for station s1 gets placed into database 73b. Likewise, database 71a gets updated since port 50a received the message sent by station s1. Finally database 75a (also 74a) gets updated because bridge 54 received a message sent by station s1 via port 54a. Filtering databases associated with a receiver port of a bridge are updated by the sender address of the message packet traversing into the bridge over the receiver port. Next, if station s2 attempts to communicate to station s1, bridge 52 will now not repeat the message through port 52a because database 73b indicates that station s1 is located on port 52b and not on 52a. Therefore, based on database 73b, bridge 52 performs a filtering procedure by not repeating the message over port 52a. As a result, the message from s2 remains local to LAN 42 as it should because the destination station s1 is also located on LAN 42. Note that when s2 communicates to s1, the identifier for s2 is placed into database 73b because bridge 52 received a message sent from station s2 over port 52b. No other databases are updated because bridge 52 did not repeat the message.

Referring to FIG. 5, next, assume that station s6 communicated to station s5 across the multiported bridge 54. Filtering database 75b on bridge 54 will update to include station s6 since it received a message originating from station s6 over port 54c. Also, since bridge 54 repeated the message to bridges 50 and 52, both databases 71b as well as database 73a will update to include the identifier for station s6. This is the case because both bridges received a message that was sent by station s6 through ports 50b and 52a respectively. If station s3 next sends a message to station s6, bridge 54 will transfer the message through port 54c and also through port 54b; in order to block the message through port 54b additional procedures are necessary in the case of multiported bridges. Also, bridge 50 will realize that the message destined for station s6 is associated with port 50b because station s6 is contained in database 71b. Therefore, bridge 50 will not forward the message to bridge 52. As can be seen, the more the bridges communicate with each other, the more the filtering databases 71–75 will become developed. Eventually the filtering databases will "stabilize" and indicate the each station associated with each particular port of a bridge.

The stabilized contents of each database are shown in FIG. 5. Each filtering database 71–75 now indicates through which port a particular receiver station can be located. It is appreciated that filtering database 73a contains stations s6, s5, s3 and s4 while database 73b contains stations s2 and s1. Bridge 52 realizes that receiver stations s6, s5, s4, and s3 may be reached via port 52a, while stations s1 and s2 may be reached via port 52b within the spanning tree active topology. Also, database 71a contains s1, s2, and s4 (associated with port 50a) while database 71b contains stations s3, s5, and s6 (associated with port 50b). Filtering database 75a (which is also 74a) contains stations s1, s2, s3 and s4 associated with port 54a. Database 75b contains only s6 for port 54c while filtering database 74b contains only station s5 for port 54b. Each bridge examines the contents of any message that passages through the bridge from a particular port within that bridge. The port the message entered the bridge from is the bridge receiving port. The sender address is placed into the filtering database that corresponds to the port of the bridge receiving port. If a subsequent message enters a bridge receiving port and contains a destination address, DA, that is within the database associated with that receiving port then the message will not be recast by the bridge and the message will not be repeated. On the other hand, if the message contains a destination address that is not within the database associated with that receiving port then the message will be recast by the ports of the bridge. Therefore, if the DA is not found in the filtering database of the entered port, then the frame is forwarded by the bridge.

It is appreciated that once the network 61 has stabilized and the filtering databases are generated, they will provide a unique pathway between communicating stations. For example, after stabilization, if station s5 communicates to station s4 the following path can be determined. The message enters bridge 54 and is directed to port 54a but not port 54c. The message then enters bridge 50 and is directed to port 50a. The message enters LAN 40 where station 4 exists but the message is also communicated to bridge 52 but will not be forwarded to port 52b because database 73a contains the identifier for station s4. Therefore, the package path traverses from LAN 48 to LAN 40 without entering any other LANs. This is the desired condition because station s5 is on LAN 48 and station s4 is on LAN 40. Likewise if station s3 communicates with station s1, the message passes from LAN 44 to LAN 42 and no other LANs are involved in the communication.

Therefore, as discussed above, it is appreciated that IEEE 802.1D conformant bridges have the property of forming a path between two conversing end stations through the processing of filtering using the filtering databases. Once the filtering databases are updated in the bridges, the frames exchanged by the two end stations traverse through only the LANs and the bridges that constitute the pathway between the end stations. The present invention discovers adjacent LANS, therefore, when the conversation between two NMMs in different LANS cannot be heard by an NMM in a third LAN. This will be discussed below.

Generation of the Active Topology from the Communication Pathways

The present invention utilizes the construction of the above pathways in order to generate the active topology of the transparent bridges and LANs. It is appreciated that the below discussion of the present invention assumes that all NMM NICs (network interface cards) are configured to run in promiscuous mode (i.e., they listen to all packets). The present inventions processing to discover the total active topology of the IEEE 802.1D bridges and LANs is performed within each designated NMM of each LAN of the network 61 and may also partially be performed within a network management station. The major computer implemented processing steps required for the processing of the present invention are illustrated in the flow chart of FIG. 6 which will be discussed below in detail.

FIG. 6 illustrates the major computer implemented processing tasks of the present invention that are performed by each NMM of each LAN within a typical system network 61. These processing tasks are accomplished via microprocessor 101 executing program steps stored in RAM 102 and/or ROM 103 that act to analyze message data entering from the signal generation port 108 (also referred to as a communications port) of each NMM. It is appreciated that each NMM or NMS may be construed as a separate computer system capable of performing the following discussed program tasks. It is appreciated that a number of software languages and procedures can be utilized by an artisan to arrive at and specifically implement these processing blocks, and others discussed throughout this specification. These such specific implementations are within the scope of the present invention. It is important to appreciate, however, that the processing blocks discussed throughout this discussion refer to processing tasks that are performed within a computer implemented communication system, and specifically within each NMM, represents NMS and NMS of the bridged LAN.

As FIG. 6 illustrates, each NMM is responsible for performing these tasks in an endless loop to construct, modify and reconstruct the active topology of the bridged LAN 61 that will be constructed within each designated NMM. The major processing begins at block 605 wherein each LAN of the system determines a designated or representative NMM from among the NMMs associated with that LAN. This method of selection involves identifying the NMM with the highest priority identifier among the NMMs of the LAN. The processing of block 610 may occur in parallel or just prior to the processing of block 605. According to block 610, the present invention directs each representative NMM to periodically broadcast or multicast their existence to all the other NMMs by an identification message identifying the presence and identification of its associated LAN within the network 61. At block 610, these frames contain the NMM's LAN identification. At block 610 the present invention collects identification information of other NMMs and performs various age out tasks. Next, the present invention directs each LAN through its designated or representative NMMs to identify the adjacent LANs at block 620 and store this adjacency information in an adjacency database associated with each NMM within RAM 102. A LAN is adjacent to another LAN if they are separated by only one bridge. The present invention determines adjacency information by utilizing the filtering databases associated with each port of each active transparent bridge. Each NMM operating the flow instructions of FIG. 6 of the present invention is called a sender NMM since it is sending adjacency request messages or PDUs to each designated NMM of the bridged LAN. The other NMMs receiving the adjacency request messages are called receiver NMMs.

Once each NMM has gathered adjacency information regarding its adjacent LANs in an adjacency database, this adjacency database is multicast over the system to all other LANS at block 630 so that each representative NMM of each LAN knows the adjacency information of the other LANS. At block 640, the multicast information from each NMM is collected by each NMM into a an active topology database which is used by the present invention to construct the displayable active topology. Next, at block 650, the present invention directs each designated NMM to construct an active topology based on the data stored within the topology adjacency database of each NMM. Thus, each NMM should generate the same active topology. Part of the processing of block 650 may be performed by a network management station. To this extent, an NMM may collect and cream the active topology database while the NMS is responsible to accessing this database and creating a displayable active topology therefrom. At block 660, after a predetermined timing period, each NMM is directed by the present invention back to block 605 for endless processing. This is done so that the present invention can adequately respond to LAN additions, deletions or modifications (relocations of LANs and bridges) during network operation period. It is noted that each of the above blocks will be further described in discussions to follow.

In so doing, the present invention processing flow of FIG. 6 allows any network management station (NMS) connected to the network 61 to poll any designated NMM of any LAN to gather the constructed active topology. This topology data can be read from RAM 102 of any NMM and placed into a communication package by microprocessor 101 of the NMM. This communication package is then placed onto the communication network via communication port 108 of the NMM and will travel as any other end station communication packet over the network 61. The active topology data is received by the network management station and the CPU 102 of the network management station will generate the active topology in graphical form onto a display screen 105 of the NMS for visualization by a user. The user can then scan the active topology via cursor control 107 to view all or portions of the topology. The active topology may be used for error checking and troubleshooting or for performance enhancement of the system or to locate redundancies within the system and backup network loops. In short, the topology data is a valuable tool to obtain and the present invention offers a system in which this active topology data can be determined and utilized by any transparent bridge which conforms to the IEEE 802.1D standard.

Each of the above major processing blocks of the preferred embodiment of the present invention will now be described in further detail.

Determination of Representative NMM of each LAN (Block 605)

Each NMM periodically multicasts identifier frames. The LAN identification in the frames allows the NMMs to be grouped by LANs. After a configurable period with a default of 30 seconds, each NMM must determine if it is the representative NMM of the particular LAN. The NMM with the highest priority (e.g., smallest MAC address) among the NMMs of each LAN is selected by the present invention to be the representative NMM for each LAN of the network 61. Only after determining that it is the representative NMM for a particular LAN may an NMM attempt to discover adjacent LANs according to the present invention. If the NMM is not the representative NMM in the local LAN and discovers that it has the smallest MAC address among the NMMs of a given LAN, then the NMM with the smallest MAC address must assume the role of a representative NMM. If the a particular NMM is the representative in the local LAN of the present invention and determines that another NMM on the LAN has a smaller MAC address then the present NMM continues performing the role of the representative for a duration (configurable with a default of 30 seconds) then relinquishes the role. This processing of the present invention allows the new representative NMM to acquire the adjacent LANs information from this NMM.

NMM/LAN Identification (Block 610)

Each LAN must be assigned a unique identification code within the bridged LAN 61. The unique ID associated with each LAN is composed of the designated bridge ID and the port ID associated with that LAN and the designated bridge. This information is contained in the BPDU (Bridge Protocol Data Unit) and is issued periodically by bridges designed to be conformant with IEEE 802.1D. Since a designated bridge broadcasts a configuration BPDU to the local LAN only, the present invention instructs the NMMs to listen to the BPDUs; only the NMMs in the same LAN will have the same LAN ID. Therefore only one representative NMM will be associated with on unique LAN. Adjacency information associated with a representative NMM may be viewed as also associated between its LAN. When two representative NMMs are adjacent, by definition, their associated LANs are also adjacent.

The processing of block 610 includes the below processing tasks performed by the present invention in each NMM. In an effort to provide a mechanism that allows representative NMMs to discover themselves, the present invention instructs each representative NMM of each LAN to periodically identify itself to the other NMMs of the system 61 by multicasting both 1) its MAC address as well as 2) the LAN ID of its local LAN in a data message called "LAN ID PDU." The above identification is performed by each representative NMM periodically at a configurable rate with a default interval of 10 seconds. Also, the present invention instructs the representative NMM of each LAN to continuously collect the LAN ID PDUs that are multicast by other NMMs and group the NMMs collected by the LANs they belong to using the LAN IDs. The present invention also directs each NMM to age out an NMM entry of the identification database if such entry is not updated after a certain configurable duration having a default value of 30 seconds. Also, if the LAN ID multicast by a representative NMM is different from its previous multicast, then the present invention directs the NMM to use the new LAN ID and delete the old associated identification information.

Identification of Adjacent LANs Utilizing End Station Pathways Created by the Filter Databases (Block 620)

The processing of block 620 of the present invention is one of the most important processing tasks. Here adjacency information is determined by the representative sender NMM for each of the LANs of the system 61. It is appreciated that valid adjacency data can be collected by the representative NMMs of the present invention according to the processing of block 620 after the filtering databases 71-75 of the transparent bridges have stabilized. The processing of block 620 may continue before stabilization, however, the active topology data constructed therefrom may not be totally valid. Therefore, according to the present invention, it is desirable to allow the filtering databases of the bridges to stabilize (a relatively short period of time) before the active topology data is utilized. The preferred embodiment of the present invention utilizes the property of the stabilized system 61 that the frames exchanged by the two end stations traverse through only the LANS and the bridges that make up the communication pathway.

According to the processing of the present invention, when a sender NMM requests adjacency information, it scans its identification database to determine the other representative NMM's within the system; these other NMMs are receiver NMMs with respect to this sender NMM. Then each NMM begins to send a special message (called an adjacency request PDU) to the other NMMs within the system. As the message passes through the system from the sender NMM to the receiving NMM, each intermediate representative NMM of each LAN that the message passes through, but that is not the receiving NMM, echoes back a message to the sender NMM that it heard the message destined for the receiver NMM; these intermediate NMMs are called eavesdropping NMMs. Refer to FIG. 7 where NMM 81, NMM 83, NMM 86, NMM 87 and NMM 84 are the representative NMMs of network 61.

Therefore, with reference to FIG. 7, when NMM 83 sends an adjacency request PDU to other representative NMM 84, the message passes through a path from LAN 42 to bridge 52 to LAN 40 and through bridge 50 to LAN 44. Although the adjacency information is destined for representative NMM 84, the message nonetheless traverses LAN 40 because this is an intermediate LAN between the end NMMs. The representative NMM of LAN 40 is illustrated in FIG. 7 as NMM 82. As the adjacency request PDU passes through LAN 40, NMM 82 generates an echo message to NMM 83 that it saw the message for representative NMM 84. NMM 82 is called an "eavesdropping NMM" with reference to the packet from NMM 83 to NMM 84. No other NMMs will generate such an echo message. After the destination representative NMM 84 receives the adjacency request PDU, it will too generate a response to the sender NMM 83. Thus, as a result of the adjacency request PDU sent from NMM 83 to NMM 84, present invention will send back to NMM 83 the following: 1) an echo message from NMM 82; and also 2) an adjacency response PDU from destination representative NMM 84. No other LANS will be involved in this message because the filtering databases 71-75 will construct the path of this message to only LANs 42, 40, and 44.

It is appreciated that NMM 83 will send an adjacency request PDU message to each representative NMM including NMM 82, NMM 84, NMM 86 and NMM 87. All of these NMMs were located in the identification database generated by processing block 610. As a result of the adjacency request PDU from NMM 83 to NMM 82, only one response will return, that is the response from representative NMM 82. As discussed before, as a result of the adjacency request PDU sent from NMM 83 to NMM 84, the present invention will send back to NMM 83 the following: 1) an echo message from NMM 82; and also 2) an adjacency response PDU from destination representative NMM 84. As a result of adjacency request PDUs sent from NMM 83 to NMM 86, three responses will be received back: 1) echo response from representative NMM 82; 2) echo response from representative NMM 84; and 3) the adjacency response from destination NMM 86. As a result of adjacency request PDUs sent from NMM 83 to NMM 87, three responses will be received back: 1) echo response from representative NMM 82; 2) echo response from representative NMM 84; and 3) the adjacency response PDU from destination NMM 87.

As can be seen by the above discussion, every representative NMM within the path of an adjacency request PDU between two end NMMs will generate an echo message (adjacency response) back to the sender NMM. Thus, by examining the adjacency responses from the communication pathways, a particular sender NMM can determine which LANs are adjacent to the particular LAN of the sender NMM. Except for the condition noted below, according to the advantageous result of the present invention, an adjacent NMM to a sender NMM will generate only one adjacency response PDU back to the sender NMM and that response will be the response from the adjacent receiver NMM; no echo responses will be received. Thus, the only receiver NMM communication that generated only one adjacency response to the sender NMM's 83 adjacency request PDU was NMM 82. Since NMM 81 is the representative NMM for LAN 40, NMM 83 knows that LAN 40 is adjacent to its associated LAN 42. Through a similar process, each representative NMM 83, 82, 84, 86, and 87 will generate adjacency information by itself being a sender NMM.

Special Case of Multiport Bridge in Block 620

Referring again to FIG. 7, bridge 54 is a three port bridge. According to the present invention, some three port bridges will repeat messages destined for one port over the other ports. For instance, if NMM 84 on LAN 44 is the sender of adjacency request PDUs to NMM 86, some three port bridges would also repeat this message to NMM 87 since NMM 87 is also coupled to bridge 54. The result would be that NMM 87 would echo back a response to NMM 84 that NMM 87 heard the adjacency request PDU that was intended for NMM 86. From the point of view of NMM 84, as a result of the adjacency request PDU targeted for NMM 86, NMM 84 receives 1) an adjacency response from NMM 86 and 2) an echo adjacency response from eavesdropping NMM 87. This would indicate that NMM 86 was not adjacent to LAN 44. This is not the case, however, as clearly LAN 48 is adjacent to LAN 44. The multiported bridge 54 generated an extra echo message from NMM 87. Likewise, when NMM 84 sends an adjacency message to NMM 87, it receives 1) the response message back from NMM 87 plus 2) an echo response message from eavesdropping NMM 86. Again, since LAN 46 is adjacent to LAN 44 the echo message is not anticipated.

The preferred embodiment of the present invention handles a case such as this by inspecting the sets of adjacency responses from the adjacency request PDUs that are transmitted for a given set of NMMs. In this case, NMM 84 is the sender NMM and NMM 86 is the receiver NMM that sends an adjacency response and NMM 87 is the eavesdropping NMM. The present invention then may believe that NMM 87 is an intermediate NMM between NMM 84 and NMM 86 (which it is not). Therefore, the present invention then sends an adjacency request PDU to NMM 87 and expects not to hear from NMM 86 because the present invention believes NMM 87 to exist in between NMM 86 and NMM 84. However, when the present invention receives a response from both NMM 87 and NMM 86 as a result of the adjacency request to NMM 87, the present invention realizes that both NMM 86 and NMM 87 are associated with a multiported bridge and that both are adjacent to NMM 84.

When the present invention receives a set of adjacency responses (including an echo response) after targeting a particular receiver NMM with an adjacency request PDU and then receives the same or consistent set of adjacency responses after targeting the echo NMM, then the present invention will know that a multiport bridge is being detected. For instance, the set of responses from the first example of NMM 84 sending to receiver NMM 86 includes responses from NMM 86 and NMM 87 (echo). Then the present invention instructs NMM 84 to target NMM 87 with an adjacency request PDU and responses come from NMM 86 (echo) and NMM 87. By comparing the adjacency response sets of these two adjacency request PDUs, it can be seen that they are of the same set, i.e., response set NMM 86, NMM 87 (echo) is consistent with response set NMM 87, NMM 86 (echo). This particular identity of responses for two different adjacency request PDUs indicates to the present invention that the NMMs associated with the equivalent set of responses must be on a multiport bridge. So the preferred embodiment of the present invention determines, through computer implemented processing, that the LANs associated with both NMM 87 and NMM 86 are adjacent to the LAN 44 associated with representative NMM 84.

Adjacency Identification Processing of Major Block 620

Refer to FIG. 8 which illustrates the major processing flow of the preferred embodiment of the present invention that is performed within block 620 in greater detail. Recall that this processing is independently carried out by each representative NMM (for example NMM 83, 81, 84, 86, and 87) of the overall system 61. Each NMM may be considered having its own computer processing abilities. The goal of this processing is to create an adjacency database that contains a listing of all the adjacent LANs for a particular NMM executing these processing blocks. Since each NMM independently processes these blocks, a separate adjacency database will be generated for each sender representative NMM.

Processing of the present invention beings at block 800 and continues to block 810 of FIG. 8. At block 810, each NMM will have already received an identification database that contains a list of all representative NMMs within the system. Of this list, each sender NMM will select a peer or receiver NMM for communication by selecting a peer index that points to a peer NMM of the identification database. For purposes of clarity, the NMM currently processing this flow of FIG. 8 will be referred to as the sender NMM. At block 820 the present invention then instructs the sender NMM to initiate communication with the receiver NMM by sending or unicasting the receiver NMM an adjacency request PDU on a periodic basis (with a configurable interval having a default of 10 seconds). The adjacency request PDU contains the MAC address of the receiver (peer) NMM and in addition a MAC header. The adjacency request PDU also stores the LAN identification of the local LAN of the sender NMM. At block 830, the sender NMM is instructed by the present invention to listen for responses to the adjacency request PDU from the peer or receiver NMM. An adjacency response PDU for the request PDU is returned by the peer NMM. Also returned to the sender NMM will be other adjacency response PDU's sent by eavesdropping representative NMMs in the LANs which are different from the LANs of the receiver peer NMM and the sender NMM. An adjacency response PDU will have the same MAC address as the adjacency request PDU whether generated by the receiver peer NMM or by an eavesdropping receiver NMM.

At block 840, the present invention instructs the NMM to analyze the adjacency response PDUs received as a result of the adjacency request to determine adjacency information. At block 840, if after n (configurable, with a default of 3)

exchanges of adjacency PDUs with a receiver peer NMM in a different LAN, the adjacency response PDU was received from this receiver peer NMM only, then the present invention marks the current receiver peer NMM as adjacent to the sender NMM at block 860 and the LANs associated with the sender NMM and the receiver NMM are recorded as adjacent. This adjacency information is stored in a temporary adjacency database associated with the sender NMM at block 860 and the sender NMM then gets another receiver peer NMM from the identification database also at block 860. The present invention then instructs the sender NMM to block 880 where the NMM checks if there are more peer NMMs within the identification database or if the current peer selected has overrun the allowable NMMs within the database. If the next peer is a valid peer NMM, then processing at block 880 instructs the sender NMM to return to the processing of 810 to perform adjacency information on the newly targeted receiver peer NMM. If the next receiver NMM selected is not a valid receiver peer NMM then the complete list of receiver peer NMMs within the identification database must have been exhausted. At this time, processing goes to block 890 where a complete adjacency database is compiled that includes all of the adjacent marked receiver peer NMMs from block 860. This adjacency database compiled by block 890 will be explained further in discussions to follow. After the adjacency database is compiled, the peer NMM index is reset so that each peer NMM of the identification database will again be polled for adjacency with the sender NMM in an effort to detect additions, deletions or relocations of NMMs and LANs. Therefore, processing continues from block 890 to block 810 after a short but predetermined delay.

Returning to block 840 of the present invention, if the first test for adjacency is not met, i.e., more than one adjacency response is returned to the sender NMM as a result of the adjacency request PDU, then the present invention directs the sender NMM to the processing of block 850. It is appreciated that block 850 of the present invention is required because in the case of a multiport bridge (3 or more ports), the conversations between two NMMs in the adjacent LANs can be heard by the NMMs in the other adjacent LANs attached to the same multiport bridge. However, if a multiport bridge has the additional intelligence so as to not transmit a frame to the LANs that are not in the path, then this bridge is functionally identical to a dual port bridge from the stand point of the present invention. In this case, the processing of block 850 may not be required.

At block 850 a second test for adjacency is performed by the present invention. If adjacent response PDUs with the same MAC address were received from multiple NMMs in different LANs after n (configurable, with the default of 3) exchanges of adjacency PDUs with a receiver peer NMM in a different LAN, then one of two cases are true. First, the peer NMM is not in the adjacent LAN, because some, if not all of the responding NMMs are in the LANs that form the path to the receiver LAN (i.e., are eavesdropping). Or second, the peer NMM is in an adjacent LAN because all the other responding NMMs belong to the other adjacent LANs connected by the same multiport bridge. At block 850 the present invention instructs the NMM to determine which case is present by determining whether the second case is true or false. If the second case is true then the NMMs in the same set of LANs connected to the multiport bridge should respond when the sender NMM transmits an adjacency request PDU to any of the previously responded receiver NMMs. In other words, the response set of NMMs should be identical for any adjacency request PDU targeted to a peer NMM associated with the adjacent multiport bridge. The present invention will scan the responses from all the receiver peer NMMs to determine if such coincidence of responses exists.

If so detected, the present invention will be directed from block 850 to block 860 where the LAN associated with the receiver peer NMM will be marked as adjacent to LAN associated with the sender NMM. The current peer index will then be incremented by one and processing then continues to block 880 as was discussed earlier. If the peer NMM failed the test of block 850, i.e., the eavesdropping NMMs did not return the same set of responses as the peer NMM, then the peer NMM is not adjacent to the sender NMM. Processing proceeds to block 870 where the current peer is not marked as adjacent. The peer index is incremented by one and the present invention directs the processing of the sender NMM to block 880 and the processing continues as was described above.

By performing the above processing tasks, each NMM of the system 61 will become a sender NMM to generate a complete adjacency database that indicates each LAN that is adjacent to the sender NMM. FIG. 9(A) illustrates a representative adjacency database 900 for a sample sender NMM. Such database of the present invention is stored in RAM memory 102 of each NMM of the system 61. Entry 901 contains the number of LAN entries that will be included within the database 900. Entry 901 is two bytes in length. Entry 902 indicates the local LAN ID which is 10 bytes long and indicates the specific LAN ID associated with the NMM that created the database 901. A LAN ID is an identification of a particular LAN and is composed of a 6 byte bridge ID as well as a two byte port ID associated with the local LAN. The remainder of the entries 903–908 of the database 900 are LAN identifications for each adjacent LAN to the local LAN as illustrated in entry 902. Entry 908 is marked as the LAN ID for the $n^{th}$ entry. The $n^{th}$ entry will be indicated by field 901 which holds the value for the number of adjacent LAN entries. Regarding the LAN IDs, the bridge identifier and the port identifier are extracted from Configuration BPDUs by the NMMs. Configuration BPDUs are multicast locally periodically by the bridges. The bridge ID found in a configuration BPDU is 8 bytes, composed of two bytes of the bridge priority and 6 bytes of the bridge address. Only the bridge address is used by the NMMs.

Multicasting and Collection of the databases 900 (Blocks 630 & 640)

As discussed earlier with reference to major block 630, the preferred embodiment of the present invention instructs each sender NMM to multicast the adjacency database 900 to all other representative NMMs of the bridged LAN 61 upon completion of each database 900. Each NMM in the bridged LAN 61 will then act under the present invention to collect this multicast information and will therefore possess a separate database 900 for each representative sender NMM. Each database 900 is then compiled by the present invention into an active topology database 920; this is accomplished at processing block 640. Using this active topology database 920, the complete diagrammatic active topology can be constructed by each representative NMM. Refer back to FIG. 7 which illustrates a typical bridged LAN 61. The bridge ID for bridge 50 is "10," the bridge ID for bridge 52 is "20," and the bridge ID for bridge 54 is "30." The LAN ID for LAN 40 is therefore "10.1" because its representative bridge is bridge 50 and LAN 40 is coupled to port "1" of this bridge. The LAN ID for LAN 42 is "20.2" because its representative bridge is bridge 42 and LAN 42 is coupled to port "2" of this bridge. The LAN ID for LAN 44 is "10.2" because its representative bridge is bridge 50 and LAN 44 is coupled to port "2" of this bridge. The LAN ID for LAN 48 is "30.2" because its representative bridge is bridge 54 and LAN 48 is coupled to port "2" of this bridge. Lastly, the LAN ID for LAN 46 is "30.3" because its representative bridge is bridge 54 and LAN 48 is coupled to port "3" of this bridge.

Using the above information, an illustrative active topology database 920 is shown in FIG. 9(B). The database 920 is configured with n columns and as many rows as there are adjacent representative NMMs to a particular sender NMM. Data for a particular NMM is represented in columns across a given row. Column 920a holds the indication of the particular sender representative NMM designated by a MAC address. Column 920b holds the information of the local LAN ID for that given representative sender NMM. Columns 920c to 920e (and beyond) hold the LAN IDs for the adjacent LANs to the local LAN. With reference to the entries for NMM 7, refer to FIG. 7 and also to FIG. 9(B). For instance, FIG. 9(B) illustrates that the local LAN ID for NMM 87 is "30.3" (by column 920b) which is LAN 46 and that the adjacent LANS (by columns 920b and 920c) have the identifiers "10.2" and "30.2" which correspond to LAN 44 and LAN 48 respectively. FIG. 7 shows that LAN 44 and LAN 48 of the present invention are separated from LAN 46 by only bridge 54, therefore they are indeed adjacent LANs to LAN 46. The entry in the database 920 in column 920e for NMM 87 is "null." This is because there are only two adjacent LANs for NMM 87. It is appreciated that the column width of database 920 of the present invention will be as long as is required to maintain the number of adjacent LANs for each NMM in the database 920. Here this width is three LANs wide, but could easily be larger for more complex bridge LANs.

Therefore, as illustrated above, the result of processing block 640 of the present invention is the active topology database 920. It is appreciated that each NMM independently performs the required computer implemented processing executed by the microprocessor 101 to transform each of the adjacency databases 900 from each representative sender NMM into the single active topology database 920 that is available from all the representative NMMs.

It is appreciated that the present invention also performs age out functions with respect to the multicast adjacency data and the active topology database 920. The present invention will age out adjacency information multicast from a remote (in a different LAN) representative NMM of an adjacent LAN if the NMM is not heard from for a configurable duration with a default of 30 seconds. This allows the present invention to accommodate reconfigurations of the system 61, i.e., relocations, additions or deletions of representative NMMs and/or LANs. Also, if the adjacent LAN's information multicast by a remote representative NMM is different from the information stored from the previous multicast then the present invention overwrites the old database with the new multicast adjacency information.

Active Topology Construction (Major Processing Block 650)

After the active topology database 920 has been generated by each representative NMM of the bridged LAN 61, the present invention may then generate the active topology in graphical, alphanumeric or diagrammatic form for display on display drive 105. An NMM can construct the spanning tree topology by adjoining the adjacent LANs as specified in the adjacent LAN information multicast by each representative NMM in the bridged LAN 61. This process may be performed by any NMM or may be performed by a network management station (NMS). A network management station is an independent computer system, having all of the elements shown in FIG. 3 and that may be coupled into any LAN of the system 61. The NMS is treated as any other station within the network. The NMS is directed by the present invention to send a message to any NMM, preferably the NMM present on the same LAN as the NMS, but any NMM may be polled. The NMS requests that the NMM transfer the active topology database 920. After the request is received by an NMM, when the NMM has completed an active database 920, it packages this database and sends it to the requester NMS.

The NMS, typically under control or direction by a user via data input 106 or cursor control input 107, then receives the active topology database 920 in RAM 102 or stores the data into the storage device 104. The NMS then proceeds to construct the active topology in graphical or diagrammatic form on display device 105. Refer to FIG. 9(C). The NMS starts from any entry in the database 920. For instance, the present invention starts using the entry for NMM 81 for the primary level. This level is then entered with the local LAN ID 950 associated with NMM 81. Next, at a level below the primary level the NMS enters the adjacent LANS 955, 960 found in columns 920c to 920e of the active topology database. The present invention then couples these LANs via a bridge connection (as shown 951 and 961). Next, the NMS processes the entries for any successive NMMs which is NMM 83. This NMM has no adjacent LANs so the next NMM 84 is processed. NMM 84 has two adjacent LANs so they are marked in the third row 970 and 965 coupled to two bridge connections 981 and 971. The processes continues until all of the LANs and associated bridge connections are displayed on the display unit 105 of the active topology of the bridged LAN. The present invention uses each adjacent LAN ID to find the entry which has it as the local LAN ID. The present invention builds another subtree using this entry. The present invention also collapses multiple lines between LANs into one single bridge connection. Also a loop with n NMMs represents an n-port bridge. The NMS may also place a representation for each NMM associated with the representation for each LAN within the active topology displayed in display unit 105.

Of course, many graphical output and display techniques and representations of the active topology may be generated employing the above procedure to illustrate interconnections between LANs, NMMs and bridges. It is appreciated that these would be within the scope of the present invention and that the present invention is not limited to the alphanumeric illustration of FIG. 9(C). For instance, instead of a numeric identification, each LAN or NMM could be represented by a graphic image and placed on the display screen 105. Each LAN image would then be interconnected to the bridged LAN 61 via bridge images. The entire active topology could be displayed on one screen or, alternatively, the active topology image could be partially displayed on the display 105 while different sections of the active topology could be viewed or scrolled via the cursor control 107.

Topology Reconfiguration Capacity Due to System Changes

The preferred embodiment of the present invention is able to accommodate certain system changes: 1) failure of bridges and NMMs; 2) additions of new LANs into the system 61; and 3) relocations of bridges, NMMs and LANs. Generally, because the major processing tasks of FIG. 6 and FIG. 8 are performed on a cyclic basis, a new active topology database 920 is constantly being generated by the representative NMMs. The present invention can therefore quickly and automatically respond to additions, deletions and relocations of NMMs, bridges, and LANs because over time nonresponsive NMMs become aged out of the system while newly inserted NMMs will begin transmitting LAN identification messages as well as adjacency request PDUs. Also, newly inserted representative NMMs begin responding to other adjacency request PDUs from the system 61. In addition, once a new NMM is inserted into a LAN, the NMMs of the LAN again determine the NMM with the highest priority to be the representative NMM. As a result, the processing of the present invention as discussed above is extremely flexible in responding to updates within the system 61. For the sake of clarity, some specific examples and procedures of the present invention in response to changes in a bridged LAN 61 are illustrated below.

A bridge failure (removal) can be broken down into two cases. A bridge fails and a LAN or a set of LANs are thus disconnected from the rest of the bridged LAN 61. The present invention will the age out of the active topology the NMMs in the separated LANs, the failed bridges and also the IDs of the separated LANs. A bridge may also fail and a redundant bridge may become activated, probably due to the recursive and continual operation of the spanning tree procedure. In this case, when a redundant bridge is activated the bridge ID in the Configuration BPDU and Topology Change Notification BPDU parameters are changed. The NMMs in the LAN will then detect this change. The representative NMM of the LAN will inform the rest of the NMMs in the bridged LAN and the present invention will therefore automatically update the active topology database 920 as a result of the updated parameters. When the backup bridge becomes active, the attached LAN will assume a new LAN identification. Therefore, the NMMs will use this new LAN identification in their periodical multicast of the identifier frame. This will cause all the NMMs to update grouping of these NMMs with the new LAN identification.

The present invention also responds to NMM failures (removals). When the only NMM in a LAN fails then the present invention will permanently age out the NMM, the LAN ID and the designated or representative bridge. Since adjacent LANs are continuously discovered, if the failed LAN is a leaf LAN (i.e., located at the end of a communication branch), the LAN is dropped from the active topology. If the failed LAN is a root of a communication subtree then the failed LAN becomes an unsupported topology because it is a requirement of the present invention that each LAN have at least one NMM in each LAN. On the other hand, if the representative NMM of a LAN fails, the other NMMs in the bridged LAN will detect this condition via the age out procedure of the present invention. The other NMMs in the local LAN will reestablish the representative NMM by selecting a new NMM, via the highest priority MAC address, for the representative. Lastly, if a non-representative NMM in a LAN fails, the other NMMs in the bridged LAN will detect this condition via the age out procedures of the present invention.

The present invention responds to additions of new LANs and NMMs into the system 61 as well as relocations of bridges, NMMs and LANs. According to the present invention, the NMMs of newly inserted LANs will start multicasting the new LAN IDs and all the representative NMMs will verify whether the new LANs are adjacent according the present invention processing flow as described above by sending adjacency request PDUs to the newly inserted NMMs. The newly discovered adjacent LAN information (newly created databases 900) are multicast by the representative NMMs that discovered it and are adjacent to the newly inserted LAN. Eventually, each NMM will receive the new databases 900 and generate an updated active topology database 920. The NMMs added to an existing LAN will assume the role of a representative NMM or a non-representative NMM depending on the MAC address of the new NMM. If the newly inserted NMM is not the representative NMM for the associated LAN then the adjacency information will not be updated since this newly inserted NMM is not included in the adjacency information exchange. Relocations of a particular bridge, NMM or LAN are treated by the present invention as a deletion followed by an addition and the required processing will be analogous to the processing for deletions and additions as already discussed above.

Stabilization of the Spanning Tree Procedure

It is appreciated that the present invention utilizes the paths formed by the filtering databases of the bridges of the communication system 61 in order to create the active topology database 920 and resultant display topology. It is further appreciated that the processing tasks shown in FIG. 6 and FIG. 8 of the present invention will occur within each NMM whether or not the spanning tree procedure is fully completed or "stabilized." Therefore, when the communication is first initialized, the data generated by the present invention (i.e., the topology database 920) may not contain valid data until the spanning tree procedure has an opportunity to fill out the filtering databases 71–75 of the transparent bridges. Therefore, the NMS of the present invention realizes that stabilization of the spanning tree procedure is required before the present invention can efficiently create an active topology of the system 61. However, because of the rapid operation of the spanning tree procedure, this time delay does not become a factor within the operation of the present invention. That is, the time required until stabilization is negligible given the overall operation of the present invention.

The preferred embodiment of the present invention, a computer implemented system for determining the active topology of a bridged LAN composed of transparent bridges containing end station pathways formed by filtering databases within the bridges, is thus described. While the present invention has been described in one particular embodiment, it should be appreciated that the present invention should not be construed as limited by such embodiment, but rather construed according to the below claims.

What is claimed is:

1. In a bridged local area network (LAN) communication system containing a plurality of LANs communicatively coupled via a plurality of transparent bridges, wherein each LAN includes a network management module (NMM), each NMM for controlling and monitoring communications between devices on its LAN and communications in and out of its LAN, a computer implemented method of determining an active topology of said bridged LAN, said computer implemented method comprising the computer implemented steps of:

constructing communication pathways between NMMs of said plurality of LANs, said step of constructing communication pathways operable within each transparent bridge; and determining the active topology of said bridged LAN utilizing said communication pathways to send and receive adjacency request messages and adjacency response messages between NMMs of different LANs and wherein adjacency to a particular LAN is determined by examining said adjacency response messages from said NMMs of different LANs resultant from said adjacency request messages sent by said NMMs of different LANs.

2. The method of claim 1 wherein said step of determining the active topology of said bridged LAN is operable within each NMM and further comprises the computer implemented steps of:

a first communication step of communicating an adjacency request message from a sender NMM to a receiver NMM over said communication pathways;

a second communication step of receiving adjacency response messages communicated by said NMMs of said bridged LAN to said sender NMM as a result of said adjacency request message, said adjacency response messages communicated over said communication pathways;

determining if said receiver NMM is adjacent to said sender NMM if only one adjacency response message is received by said second communication step; and repeating the above steps for a different receiver NMM until an adjacency request message is sent to each NMM of said bridged LAN.

3. The method of claim 1 wherein said step of constructing is implemented according to a spanning tree procedure.

4. The method of claim 3 wherein said spanning tree procedure is approximate to IEEE 802.1D specification standard.

5. The method of claim 1 wherein said step of determining the active topology further comprises the computer implemented step of determining that different receiver NMMs are adjacent to said sender NMM if sets of adjacent response messages received during said second communication step are consistent and are resultant from adjacency request messages sent by said sender NMM to each of said different receiver NMMs associated with a multiported bridge.

6. The method of claim 1 wherein said step of determining the active topology further comprises the computer implemented steps of:

identifying an associated LAN for each receiver NMM determined to be adjacent and for each sender NMM;

compiling an adjacency database for each sender NMM, said adjacency database for recording the associated LAN for each adjacent receiver NMM to each sender NMM; and multicasting said adjacency database over said bridged LAN to all other NMMs of said bridged LAN.

7. The method of claim 6 further comprising the computer implemented steps of:

compiling an active topology database by collecting and compiling each adjacency database multicasted onto said bridged LAN by each sender NMM; and displaying a diagrammatic representation of said active topology of said bridged LAN by reading said active topology database and coupling LANs indicated as adjacent by said active topology database.

8. The method of claim 6 further comprising the computer implemented step of initiating each NMM within a communication pathway between said sender NMM and said receiver NMM to generate an echo response message as a result of said adjacency request message sent to said receiver NMM.

9. A method of determining a topology of a network, said network including a first local area network (LAN), a second LAN, and a third LAN, each of said first, second, and third LANs including one or more network management modules (NMMs), each NMM for controlling and monitoring communications between devices on its LAN and communications in and out of its LAN, said method comprising the steps of:

(a) determining a representative first NMM, for said first LAN;

(b) determining a representative second NMM for said second LAN;

(c) determining a representative third NMM for said third LAN;

(d) determining whether said first LAN is one hop away from said second LAN and if so, recording in an adjacency database the one hop away relationship between said first LAN and said second LAN;

(e) determining whether said first LAN is one hop away from said third LAN and if so, recording in an adjacency database the one hop away relationship between said first LAN and said third LAN; and (f) determining whether said second LAN is one hop away from said third LAN and if so, recording in an adjacency database the one hop away relationship between said second LAN and said third LAN; and (g) building a topology database based upon said adjacency databases, said topology database containing a representation of the topology of the network.

10. The method as recited by claim 9 wherein said step (d) of determining whether said first LAN is one hop away from said second LAN is carried out by determining if messages communicated from said first LAN to devices on said second LAN are transmitted to said third LAN.

11. The method as recited by claim 9 wherein the step (d) of determining whether said first LAN is one hop away from said second LAN is performed by said representative first NMM and if said first LAN is one hop away from said second LAN, a message is transmitted to a network management station (NMS), said network management station recording the one hop away relationship between said first LAN and said second LAN in a topology database.

12. The method of claim 9 further comprising the step of displaying a graphical representation of the topology of the network on a display.

13. A method of determining a topology of a network, said network comprising a first transparent bridge coupling a first local area network (LAN) and a second LAN and a second transparent bridge coupling said second LAN and a third LAN, each of said first, second, and third LANs including a network management module (NMM) for controlling and monitoring communications between devices on its LAN and communications in and out of its LAN, said method comprising the steps of:

(a) a first NMM determining that said first LAN is one hop away from said second LAN over said first transparent bridge and recording in a topology database the one hop away relationship between said first LAN and said second LAN;

(b) a second determining that said second LAN is one hop away from said third LAN and recording in said topology database the one hop away relationship between said second LAN and said third LAN; and (c) building a representation of the topology of the network based upon the one hop away relationships.

14. The method as recited by claim 13 wherein said step (a) of a first NMM determining that said first LAN is one hop away from said second LAN is carried out by determining if messages communicated from said first LAN to devices on said second LAN are transmitted to said third LAN.

15. The method of claim 13 further comprising the step of displaying a graphical representation of said topology on a display.

16. In a bridged local area network (LAN) communication system, an improved method of determining an active topology of said bridged LAN, said bridged LAN containing a plurality of LANs communicatively coupled via a plurality of transparent bridges, wherein each LAN includes a network management module (NMM), each NMM for controlling and monitoring communications between devices on its LAN and communications in and out of its LAN, wherein a spanning tree procedure has eliminated communication loops in said bridged LAN, wherein communication pathways have been created between the NMMs of said plurality of LANs based upon filtering databases established at each of said plurality of transparent bridges as a result of the spanning tree procedure, wherein the improvement comprises the computer implemented steps of:

for each of said plurality of LANs
selecting a NMM as a designated NMM for the LAN,
said designated NMM identifying those of said plurality of LANs that are adjacent to the LAN,
said designated NMM storing adjacency information in an adjacency database, said adjacency information resulting from said step of identifying those of said plurality of LANs that are adjacent to the LAN,
said designated NMM multicasting said adjacency information to other NMMs,
said designated NMM receiving the multicast adjacency information sent by other NMMs, and
said designated NMM determining the active topology based upon the multicast adjacency information.

17. The method of claim 16 wherein each of said plurality of LANs includes one or more NMMs, wherein said step of selecting a NMM as a designated NMM further comprises the steps of:

each of said one or more NMMs multicasting an identifier onto the LAN; and identifying the NMM of said one or more NMMs with the highest priority identifier.

18. The method of claim 17 wherein said identifier includes a media access control (MAC) address.

19. The method of claim 16 further comprising the step of said designated NMM identifying itself to the other NMMs of the plurality of LANs by multicasting a media access control (MAC) address and a LAN ID.

20. The method of claim 16 wherein said step of said designated NMM identifying those of said plurality of LANs that are adjacent to the LAN further comprises the steps of:

said designated NMM sending an adjacency request to the other designated NMMs of said plurality of LANs;

in response to said adjacency requests said designated NMM receiving adjacency responses from the other designated NMMs;

in response to said adjacency requests said designated NMM receiving echo responses from those of the other designated NMMs that hear the adjacency requests yet are not intended recipients of said adjacency requests; and based upon said echo responses and said adjacency responses, said designated NMM determining which of said plurality of LANs are adjacent to the LAN.

21. The method of claim 16 wherein a network management station (NMS) is coupled to said bridged LAN, said method further comprising the steps of:

said NMS requesting the active topology from one of the plurality of designated NMMs; and after receiving the active topology, said NMS constructing a graphical representation of said active topology on a display device.

* * * * *